US012493042B2

(12) United States Patent
Havranek et al.

(10) Patent No.: US 12,493,042 B2
(45) Date of Patent: Dec. 9, 2025

(54) MOLECULES AND METHODS FOR ITERATIVE POLYPEPTIDE ANALYSIS AND PROCESSING

(71) Applicant: Washington University, St. Louis, MO (US)

(72) Inventors: James J. Havranek, Clayton, MO (US); Benjamin Borgo, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 18/524,884

(22) Filed: Nov. 30, 2023

(65) Prior Publication Data
US 2024/0201199 A1 Jun. 20, 2024

Related U.S. Application Data

(60) Continuation of application No. 17/088,898, filed on Nov. 4, 2020, now abandoned, which is a continuation of application No. 16/907,813, filed on Jun. 22, 2020, now Pat. No. 10,852,305, which is a continuation of application No. 15/255,433, filed on Sep. 2, 2016, now abandoned, which is a division of application No. 14/211,448, filed on Mar. 14, 2014, now Pat. No. 9,435,810.

(60) Provisional application No. 61/798,705, filed on Mar. 15, 2013.

(51) Int. Cl.
| | | |
|---|---|---|
| *C12Q 1/34* | (2006.01) | |
| *C12N 9/00* | (2006.01) | |
| *C12N 9/48* | (2006.01) | |
| *C12N 9/50* | (2006.01) | |
| *C12N 9/52* | (2006.01) | |
| *C12N 9/64* | (2006.01) | |
| *G01N 33/68* | (2006.01) | |

(52) U.S. Cl.
CPC ......... *G01N 33/6824* (2013.01); *C12N 9/485* (2013.01); *C12N 9/52* (2013.01); *C12N 9/641* (2013.01); *C12N 9/93* (2013.01); *C12Y 304/11018* (2013.01); *C12Y 601/0101* (2013.01); *C12Y 601/0102* (2013.01); *C12Y 601/01021* (2013.01)

(58) Field of Classification Search
CPC ...... G01N 33/6824; G01N 33/68; C12N 9/50; C12N 9/52; C12N 9/48; C12N 9/00; C12Q 1/34
See application file for complete search history.

(56) References Cited

U.S. PATENT DOCUMENTS

| | | |
|---|---|---|
| 7,611,834 B2 | 11/2009 | Chhabra et al. |
| 8,340,951 B2 | 12/2012 | Baker et al. |
| 2004/0005582 A1 | 1/2004 | Shipwash |
| 2007/0218503 A1 | 9/2007 | Mitra |

FOREIGN PATENT DOCUMENTS

WO 2010/065531 A1 6/2010

OTHER PUBLICATIONS

Anderson, N.L., et al., The Human Plasma Proteome: History, Character, and Diagnostic Prospects, 2002, Mol Cell Proteomics, 1.11, pp. 845-867.
Arnez, J.G., et al., "The first step of aminoacylation at the atomic level in histidyl-tRNA synthetase," 1997, PNAS USA., 94:7144-7149.
Ashworth, J., et al., Computational Redesign of Endonuclease DNA Binding and Cleavage Specificity, 2006, Nature, 441:656-659.
Ashworth, J., et al. "Computational Reprogramming of Homing Endonuclease Specificity at Multiple Adjacent Base Pairs," 2010, Nucleic Acids Res., 38/16:5601-5608.
Augustine, J., et al., "Design of an Active Fragment of a Class II Aminoacyl-tRNA Synthetase and Its Significance for Synthetase Evolution," 1997, Biochemistry, 36:3473-3482.
Barrett, G.C., et al., "Edman Stepwise Degradation of Polypeptides: A New Strategy Employing Mild Basic Cleavage Conditions," 1985, Tetrahedron Lett., 26:4375-4378.
Berman, H., et al., "The worldwide Protein Data Bank (wwPDB): ensuring a single, uniform archive of PDB data," 2007, Nucleic Acids Res., 35:D301-D303.
Carter, P., et al., "Engineering enzyme specificity by substrate-assisted catalysis," 1987, Science, 237:394-399.
Celej, M.S., et al., "Protein stability induced by ligand binding correlates with changes in protein flexibility," 2003, Protein Sci., 12:1496-1506.
Chiravuri M, et al., "Vesicular Localization and Characterization of a Novel Post-Proline-Cleaving Aminodipeptidase, Quiescent Cell Proline Dipeptidase," 2000, J Immunol., 165:5695-5702.
Choe, Y., et al., "Development of α-keto-based inhibitors of cruzain, a cysteine protease implicated in Chagas disease," 2005, Bioorg Med Chem., 13:2141-2156.
Dantas, G., et al., "High-resolution Structural and Thermodynamic Analysis of Extreme Stabilization of Human Procarboxypeptidase by Computational Protein Design," 2007, J Mol Biol., 366:1209-1221.

(Continued)

*Primary Examiner* — Maryam Monshipouri
(74) *Attorney, Agent, or Firm* — Stinson LLP

(57) ABSTRACT

Reagents and methods for the digital analysis of proteins or peptides are provided. Specifically provided herein are proteins for identifying the N-terminal amino acid or N-terminal phosphorylated amino acid of a polypeptide. Also, an enzyme for use in the cleavage step of the Edman degradation reaction and a method for using this enzyme are described.

11 Claims, 8 Drawing Sheets

Specification includes a Sequence Listing.

(56) References Cited

OTHER PUBLICATIONS

Dunbrack, R.L. et al., "Backbone-dependent Rotamer Library for Proteins Application to Side-chain Prediction," 1993, J Mol Biol., 230:543-574.
Duncan, M.W., et al., "The pros and cons of peptide-centric proteomics," 2010, Nature Biotechnology, 28:659-664.
Edman P., "Method for Determination of the Amino Acid Sequence in Peptides," 1950, Acta Chem Scand., 4:283-293.
Emmert-Buck, M.R., et al., "Laser Capture Microdissection," 1996, Science, 274:998-1001.
Finn, R.D., et al., "The Pfam protein families database," 2008, Nucleic Acids Res., 36, pp. D281-D288.
Fukunaga, R., et al., "Structural insights into the first step of RNA-dependent cysteine biosynthesis in archaea," 2007, Nat Struct Mol Biol., 14:272-279.
Gillette, M.A., et al. "Place of Pattern in Proteomic Biomarker Discovery," 2005, J Proteome Res., 4: 1143-1154.
Grimsrud, P.A., et al., "Phosphoproteomics for the Masses," 2010, ACS Chem Biol., 5:105-119.
Havranek, J.J., et al., "Automated design of specificity in molecular recognition," 2003, Nat Struct Biol., 10:45-52.
Havranek, J.J., et al., "Motif-directed flexible backbone design of functional interactions," 2009, Protein Sci., 18: 1293-1305.
Holm, L., et al., "Dali server: conservation mapping in 3D," 2010, Nucleic Acids Res., 38:W545-W549.
Ingolia, N.T., et al., "Genome-wide analysis in vivo of translation with nucleotide resolution using ribosome profiling," 2009, Science, 324:218-223.
Jiang, L., et al., "De novo computational design of retro-aldol enzymes," 2008, Science, 319:1387-1391.
Kavran, J.M., et al., "Structure of pyrrolysyl-tRNA synthetase, an archaeal enzyme for genetic code innovation," 2007, PNAS USA,, 104:11268-11273.
Kuhlman, B., et al., "Native protein sequences are close to optimal for their structures," 2000, PNAS USA, 97:10383-10388.
Laursen, R.A., "Solid-Phase Edman Degradation an Automatic Peptide Sequencer," 1971, Eur J Biochem, 20:89-102.
Liu, C.C., et al., "Recombinant expression of selectively sulfated proteins in *Escherichia coli*," 2006, Nat Biotechnol., 24:1436-1440.
McGrath, M.E., "The lysosomal cysteine proteases," 1999, Annu Rev Biophys Biomol Struct., 28:181-204.
McLachlin, D.T., et al., "Analysis of phosphorylated proteins and peptides by mass sepctrometry," 2001, Curr Op Chem Biol, 5:591-602.
O'Brien, P.J., et al., "Catalytic promiscuity and the evolution of new enzymatic activities," 1999, Chem Biol., 6:R91-R105.
Rothlisberger, D., et al., "Kemp elimination catalysts by computational enzyme design," 2008, Nature, 453:190-195.
Schmidt, M.W., et al., "General atomic and molecular electronic structure system," 1993, J Comput Chem., 14:1347-1363.
Schmitt, E., et al., "Switching from an induced-fit to a lock-and-key mechanism in an aminoacyl-tRNA synthetase with modified specificity," 2009, J Mol Biol., 394:843-851.
Steen, H., et al., "The ABC's (and XYZ's) of Peptide Sequencing," 2004, Mol Cell Biol, 5:699-711.
Sterner, R., et al., "Computational Design of Enzymes," 2008, Chemistry & Biology, 15:421-423.
Studier, F.W., "Protein production by auto-induction in high-density shaking cultures," 2005, Protein Expr Purif., 41:207-234.
Tessler, L.A., et al., "Protein Quantification in Complex Mixtures by Solid Phase Single-Molecule Counting," 2009, Anal Chem. 81:7141-7148.
Tessler, L.A., et al., "Nanogel surface coatings for improved single-molecule imaging substrates," 2011, J R Soc Interface, 8:1400-1408.
Tessler, L., "Digital Protein Analysis: Technologies for Protein Diagnostics and Proteomics through Single-Molecule Detection," Jan. 1, 2011, Electronic Theses and Dissertations, Paper 346, 147 pages.
Turner, J.M., et al., "Structural characterization of a p-acetylphenylalanyl aminoacyl-tRNA synthetase," 2005, J Am Chem Soc., 127:14976-14977.
Williams, N.A., et al., "Protein Sequencing in the Proteomic Age," 2001, Poster #263, 15th Symposium of the Protein Society, Philadelphia, PA, 17 pages.
Wolf, Y.I., et al., "Evolution of aminoacyl-tRNA synthetases-analysis of unique domain architectures and phylogenetic trees reveals a complex history of horizontal gene transfer events," 1999, Genome Res., 9:689-710.
Xie, J., et al., "A genetically encoded metabolically stable analogue of phosphotyrosine in *Escherichia coli*," ACS Chem Biol., 2:474-478.
Yamaguchi, M., et al., "High-Throughput Method for Terminal Sequencing of Proteins by MALDI Mass Spectrometry," 2005, Anal Chem, 77:645-651.
Handbook, Fluorescence Imaging Principles and Methods, Amersam Biosciences, 63-0035-28 Rev.AB, Oct. 2002, 166 pages.
A Practical Guide to Protein and Peptide Purification and Microsequencing, "Chapter 4: Protein and Peptide Purification for Microsequencing," 1993, P. Matsudaira, Ed., Academic Press, London, England 7 pages.
Protein Sequencing, Yale School of Medicine, W.M. Keck Foundation, Website http:\\medicine.yale.edu, downloaded Mar. 4, 2014, 1 page.
Notice to File Missing Parts of Nonprovisional Application, issued Apr. 1, 2014, in U.S. Appl. No. 14/211,448, 2 pages.
Preliminary Amendment A filed Apr. 30, 2014, in U.S. Appl. No. 14/211,448, 6 pages.
Notice to Comply, issued May 13, 2015, in U.S. Appl. No. 14/211,448, 3 pages.
Preliminary Amendment B filed Jun. 15, 2015, in U.S. Appl. No. 14/211,448, 7 pages.
Office Action (Restriction Requirement) issued Dec. 22, 2015, in U.S. Appl. No. 14/211,448, 7 pages.
Amendment C filed Feb. 22, 2016, in U.S. Appl. No. 14/211,448, 7 pages.
Examiner's Interview Summary issued Feb. 19, 2016, in U.S. Appl. No. 14/211,448, 3 pages.
Amendment D filed Apr. 26, 2016, in U.S. Appl. No. 14/211,448, 6 pages.
Notice of Allowance issued May 4, 2016, in U.S. Appl. No. 14/211,448, 17 pages.
Notice to File Missing Parts of Nonprovisional Application issued Sep. 13, 2016, in U.S. Appl. No. 15/255,433, 2 pages.
Preliminary Amendment A filed Nov. 14, 2016, in U.S. Appl. No. 15/255,433, 8 pages.
Office Action (Restriction Requirement) issued Jun. 26, 2019, in U.S. Appl. No. 15/255,433, 7 pages.
Preliminary Amendment B and Response to Restriction Requirement filed Dec. 23, 2019, in U.S. Appl. No. 15/255,433, 9 pages.
Non-Final Office Action issued Feb. 20, 2020, in U.S. Appl. No. 15/255,433, 16 pages.

SEQUENCE LISTING

```
Sequence total quantity: 30
SEQ ID NO: 1                moltype = AA  length = 264
FEATURE                     Location/Qualifiers
source                      1..264
                            mol_type = protein
                            organism = Escherichia coli
SEQUENCE: 1
MAISIKTPED IEKMRVAGRL AAEVLEMIEP YVKPGVSTGE LDRICNDYIV NEQHAVSACL   60
GYHGYPKSVC ISINEVVCHG IPDDAKLLKD GDIVNIDVTV IKDGFHGDTS KMFIVGKPTI  120
MGERLCRITQ ESLYLALRMV KPGINLREIG AAIQKFVEAE GFSVVREYCG HGIGRGFHEE  180
PQVLHYDSRE TNVVLKPGMT FTIEPMVNAG KKEIRTMKDG WTVKTKDRSL SAQYEHTIVV  240
TDNGCEILTL RKDDTIPAII SHDE                                         264

SEQ ID NO: 2                moltype = AA  length = 264
FEATURE                     Location/Qualifiers
source                      1..264
                            mol_type = protein
                            organism = Escherichia coli
SEQUENCE: 2
MAISIKTPED IEKMRVAGRL AAEVLEMIEP YVKPGVSTGE LERICWDYIV NEQHATDSLT   60
GHNGIDGHGS ISINEVVCHG VPDDAKLLKD GDIVNIDVTV RKDGFHGDTS KMFIVGKPTI  120
MGERLCRITQ ESLYLALRMV KPGINLREIG AAIQKFVEAE GFSVVREYCG HGIGRGHHEE  180
PQVLHYDSRE TNVVLKPGMT FTIEPMVNAG KKEIRTMKDG STVKTKDRSL SAQYEHTIVV  240
TDNGCEILTL RKDDTIPAII SHDE                                         264

SEQ ID NO: 3                moltype = AA  length = 544
FEATURE                     Location/Qualifiers
source                      1..544
                            mol_type = protein
                            organism = Escherichia coli
SEQUENCE: 3
AKKILVTCAL PYANGSIHLG HMLEHIQADV WVRYQRMRGH EVNFICADDA HGTPIMLKAQ   60
QLGITPEQMI GEMSQEHQTD FAGFNISYDN YHSTHSEENR QLSELIYSRL KENGFIKNRT  120
ISQLYDPEKG MFLPDRFVKG TCPKCKSPDQ YGDNCEVCGA TYSPTELIEP KSVVSGATPV  180
MRDSEHFFFD LPSFSEMLQA WTRSGALQEQ VANKMQEWFE SGLQQWDISR DAPYFGFEIP  240
NAPGKYFYVW LDAPIGYMGS FKNLCDKRGD SVSFDEYWKK DSTAELYHFI GKDIVYFHSL  300
FWPAMLEGSN FRKPSNLFVH GYVTVNGAKM SKSRGTFIKA STWLNHFDAD SLRYYYTAKL  360
SSRIDDIDLN LEDFVQRVNA DIVNKVVNLA SRNAGFINKR FDGVLASELA DPQLYKTFTD  420
AAEVIGEAWE SREFGKAVRE IMALADLANR YVDEQAPWVV AKQEGRDADL QAICSMGINL  480
FRVLMTYLKP VLPKLTERAE AFLNTELTWD GIQQPLLGHK VNPFKALYNR IDMRQVEALV  540
EASK                                                               544

SEQ ID NO: 4                moltype = AA  length = 544
FEATURE                     Location/Qualifiers
source                      1..544
                            mol_type = protein
                            organism = Escherichia coli
SEQUENCE: 4
AKKILVTCAS PYANGSIHLG HMLEHIQADV WVRYQRMRGH EVNFICADDA HGTPIMLKAQ   60
QLGITPEQMI GEMSQEHQTD FAGFNISYDN YHSTHSEENR QLSELIYSRL KENGFIKNRT  120
ISQLYDPEKG MFLPDRFVKG TCPKCKSPDQ YGDNCEVCGA TYSPTELIEP KSVVSGATPV  180
MRDSEHFFFD LPSFSEMLQA WTRSGALQEQ VANKMQEWFE SGLQQWDISR DAPYFGFEIP  240
NAPGKYFYVW LDAPIGLMGS FKNLCDKRGD SVSFDEYWKK DSTAELYHFI GKGIVYFLSL  300
FWPAMLEGSN FRKPSNLFVH GYVTVNGAKM SKSRGTFIKA STWLNHFDAD SLRYYYTAKL  360
SSRIDDIDLN LEDFVQRVNA DIVNKVVNLA SRNAGFINKR FDGVLASELA DPQLYKTFTD  420
AAEVIGEAWE SREFGKAVRE IMALADLANR YVDEQAPWVV AKQEGRDADL QAICSMGINL  480
FRVLMTYLKP VLPKLTERAE AFLNTELTWD GIQQPLLGHK VNPFKALYNR IDMRQVEALV  540
EASK                                                               544

SEQ ID NO: 5                moltype = AA  length = 677
FEATURE                     Location/Qualifiers
source                      1..677
                            mol_type = protein
                            organism = Escherichia coli
SEQUENCE: 5
MTQVAKKILV TCALPYANGS IHLGHMLEHI QADVWVRYQR MRGHEVNFIC ADDAHGTPIM   60
LKAQQLGITP EQMIGEMSQE HQTDFAGFNI SYDNYHSTHS EENRQLSELI YSRLKENGFI  120
KNRTISQLYD PEKGMFLPDR FVKGTCPKCK SPDQYGDNCE VCGATYSPTE LIEPKSVVSG  180
ATPVMRDSEH FFFDLPSFSE MLQAWTRSGA LQEQVANKMQ EWFESGLQQW DISRDAPYFG  240
FEIPNAPGKY FYVWLDAPIG YMGSFKNLCD KRGDSVSFDE YWKKDSTAEL YHFIGKDIVY  300
FHSLFWPAML EGSNFRKPSN LFVHGYVTVN GAKMSKSRGT FIKASTWLNH FDADSLRYYY  360
TAKLSSRIDD IDLNLEDFVQ RVNADIVNKV VNLASRNAGF INKRFDGVLA SELADPQLYK  420
TFTDAAEVIG EAWESREFGK AVREIMALAD LANRYVDEQA PWVVAKQEGR DADLQAICSM  480
GINLFRVLMT YLKPVLPKLT ERAEAFLNTE LTWDGIQQPL LGHKVNPFKA LYNRIDMRQV  540
EALVEASKEE VKAAAAPVTG PLADDPIQET ITFDDFAKVD LRVALIENAE FVEGSDKLLR  600
LTLDLGGEKR NVFSGIRSAY PDPQALIGRH TIMVANLAPR KMRFGISEGM VMAAGPGGKD  660
IFLLSPDAGA KPGHQVK                                                 677
```

```
SEQ ID NO: 6              moltype = AA  length = 265
FEATURE                   Location/Qualifiers
source                    1..265
                          mol_type = protein
                          organism = Thermus thermophilus
SEQUENCE: 6
VDVSLPGASL FSGGLHPITL MERELVEIFR ALGYQAVEGP EVESEFFNFD ALNIPEHHPA   60
RDMWDTFWLT GEGFRLEGPL GEEVEGRLLL RTHTSPMQVR YMVAHTPPFR IVVPGRVFRF  120
EQTDATHEAV FHQLEGLVVG EGIAMAHLKG AIYELAQALF GPDSKVRFQP VYFPFVEPGA  180
QFAVWWPEGG KWLELGGAGM VHPKVFQAVD AYRERLGLPP AYRGVTGFAF GLGVERLAML  240
RYGIPDIRYF FGGRLKFLEQ FKGVL                                       265

SEQ ID NO: 7              moltype = AA  length = 250
FEATURE                   Location/Qualifiers
source                    1..250
                          mol_type = protein
                          organism = Thermus thermophilus
SEQUENCE: 7
VDVSLPGASL FSGGDHPITL MERELVEIFR ALGYQAVEGP EVESEFFNFD ALNIPENGPA   60
RDMWDTVGKT GEGFRLEGPD GEEVEGRLLL RTHTSPMQVR YMVAHTPPFR IVVPGRVFRA  120
EQTDATAEAV FHQLEGLVVG EGVNEGDLYG AIYELAQALF GPDSKVRFQP VTFPFVEPGA  180
QFAVWWPEGG KWLELGGAGM VGPNVFQAVD AYRERLGDPP AYRGVTGFAF GLGVERLAML  240
RYGIPDIRYF                                                        250

SEQ ID NO: 8              moltype = AA  length = 350
FEATURE                   Location/Qualifiers
source                    1..350
                          mol_type = protein
                          organism = Thermus thermophilus
SEQUENCE: 8
MLEEALAAIQ NARDLEELKA LKARYLGKKG LLTQEMKGLS ALPLEERRKR GQELNAIKAA   60
LEEAALEAREK ALEEAALKEA LERERVDVSL PGASLFSGGL HPITLMEREL VEIFRALGYQ  120
AVEGPEVESE FFNFDALNIP EHHPARDMWD TFWLTGEGFR LEGPLGEEVE GRLLLRTHTS  180
PMQVRYMVAH TPPFRIVVPG RVFRFEQTDA THEAVFHQLE GLVVGEGIAM AHLKGAIYEL  240
AQALFGPDSK VRFQPVYFPF VEPGAQFAVW WPEGGKWLEL GGAGMVHPKV FQAVDAYRER  300
LGLPPAYRGV TGFAFGLGVE RLAMLRYGIP DIRYFFGGRL KFLEQFKGVL             350

SEQ ID NO: 9              moltype = AA  length = 177
FEATURE                   Location/Qualifiers
source                    1..177
                          mol_type = protein
                          organism = Escherichia coli
SEQUENCE: 9
NIQAIRGMND YLPGETAIWQ RIEGTLKNVL GSYGYSEIRL PIVEQTPLFK RAIGEVTDVV   60
EKEMYTFEDR NGDSLTLRPE GTAGCVRAGI EHGLLYNQEQ RLWYIGPMFR HERPQKGRYR  120
QFHQLGCEVF GLQGPDIDAE LIMLTARWWR ALGISEHVTL ELNSIGSLEA RANYRDA     177

SEQ ID NO: 10             moltype = AA  length = 171
FEATURE                   Location/Qualifiers
source                    1..171
                          mol_type = protein
                          organism = Escherichia coli
SEQUENCE: 10
KNIQAIRGMN DYLPGETAIW QRIEGTLKNV LGSYGYSEIR LPIVEQTPLF KRAIGEVTDV   60
VEKEMYTFED RNGDSLTLRP EGTAGCVRAG IEHGLLYNQE QRLWYIGPMF GNAPQFHQLG  120
CEVFGLQGPD IDAELIMLTA RWWRALGISE HVTLELNSIG SLEARANYRD A           171

SEQ ID NO: 11             moltype = AA  length = 258
FEATURE                   Location/Qualifiers
source                    1..258
                          mol_type = protein
                          organism = Escherichia coli
SEQUENCE: 11
SKSTAEIRQA FLDFFHSKGH QVVASSSLVP HNDPTLLFTN AGMNQFKDVF LGLDKRNYSR   60
ATTSQRCVRA GGKHNDLENV GYTARHHTFF EMLGNFSFGD YFKHDAIQFA WELLTSEKWF  120
ALPKERLWVT VYESDDEAYE IWEKEVGIPR ERIIRIGDNK GAPYASDNFW QMGDTGPCGP  180
CTEIFYDHGD HIWGGPPGSP EEDGDRYIEI WNIVFMQFNR QADGTMEPLP KPSVDTGMGL  240
ERIAAVLQHV NSNYDIDL                                               258

SEQ ID NO: 12             moltype = AA  length = 467
FEATURE                   Location/Qualifiers
source                    1..467
                          mol_type = protein
                          organism = Escherichia coli
SEQUENCE: 12
EKQTIVVDYS APNVAKEMHV GHLRSTIIGD AAVRTLEFLG HKVIRANHVG DWGTQFGMLI   60
AWLEKQQQEN AGEMELADLE GFYRDAKKHY DEDEEFAERA RNYVVKLQSG DEYFREMWRK  120
LVDITMTQNQ ITYDRLNVTL TRDDVMGESL YNPMLPGIVA DLKAKGLAVE SEGATVVFLD  180
EFKNKEGEPM GVIIQKKDGG YLYTTTDIAC AKYRYESLHA DRVLYYIDSR QHQHLMQAWA  240
```

```
IVRKAGYVPE SVPLEHHMFG MMLGKDGKPF KTRAGGTVKL ADLLDETLER ARRLVAEKNP  300
DMPADELEKL ANAVGIGAVK YADLSKNRTT DYIFDWDNML AFEGNTAPYM QYAYTRVLSV  360
FRKAEINEEQ LAAAPVIIRE DREAQLAARL LQFEETLTVV AREGTPHVMC AYLYDLAGLF  420
SGFYEHCPIL SAENEEVRNS RLKLAQLTAK TKLGLDTLG IETVERM                 467

SEQ ID NO: 13            moltype = AA   length = 345
FEATURE                  Location/Qualifiers
source                   1..345
                         mol_type = protein
                         organism = Escherichia coli
SEQUENCE: 13
SIEYLREVAH LRPRTNLIGA VARVRHTLAQ ALHRFFNEQG FFWVSTPLIT ASDTEGAGEM   60
FRVSTLDLEN LPRNDQGKVD FDKDFFGKES FLTVSGQLNG ETYACALSKI YTFGPTFRAE  120
NSNTSRHLAE FWMLEPEVAF ANLNDIAGLA EAMLKYVFKA VLEERADDMK FFAERVDKDA  180
VSRLERFIEA DFAQVDYTDA VTILENCGRK FENPVYWGVD LSSEHERYLA EEHFKAPVVV  240
KNYPKDIKAF YMRLNEDGKT VAAMDVLAPG IGEIIGGSQR EERLDVLDER MLEMGLNKED  300
YWWYRDLRRY GTVPHSGFGL GFERLIAYVT GVQNVRDVIP FPRTP                  345

SEQ ID NO: 14            moltype = AA   length = 449
FEATURE                  Location/Qualifiers
source                   1..449
                         mol_type = protein
                         organism = Escherichia coli
SEQUENCE: 14
LPLDSNHVNT EEARLKYRYL DLRRPEMAQR LKTRAKITSL VRRFMDDHGF LDIETPMLTK   60
ATPEGARDYL VPSRVHKGKF YALPQSPQLF KQLLMMSGFD RYYQIVKCFR DEDLRADRQP  120
EFTQIDVETS FMTAPQVREV MEALVRHLWL EVKGVDLGDF PVMTFAEAER RYGSDKPDLR  180
NPMELTDVAD LLRSVEFAVF AGPANDPKGR VAALRVPGGA SLTRKQIDEY DNFVKIYGAK  240
GLAYIKVNER AKGLEGINSP VAKFLNAEII EAILDRTAAQ DGDMIFFGAD NKKIVADAMG  300
ALRLKVGKDL GLTDESKWAP LWVIDFPMFE DDGEGGLTAM HHPFTSPKDM TAAELKAAPE  360
NAVANAYDMV INGYEVGGGS VRIHNGDMQQ TVFGILGINE EEQREKFGFL LDALKYGTPP  420
HAGLAFGLDR LTMLLTGTDN IRDVIAFPK                                    449

SEQ ID NO: 15            moltype = AA   length = 304
FEATURE                  Location/Qualifiers
source                   1..304
                         mol_type = protein
                         organism = Escherichia coli
SEQUENCE: 15
MLKIFNTLTR QKEEFKPIHA GEVGMYVCGI TVYDLCHIGH GRTFVAFDVV ARYLRFLGYK   60
LKYVRNITDI DDKIIKRANE NGESFVAMVD RMIAEMHKDF DALNILRPDM EPRATHHIAE  120
IIELTEQLIA KGHAYVADNG DVMFDVPTDP TYGVLSRQDL DQLQAGARVD VVDDKRNPMD  180
FVLWKMSKEG EPSWPSPWGA GRPGWHIECS AMNCKQLGNH FDIHGGGSDL MFPHHENEIA  240
QSTCAHDGQY VNYWMHSGMV MVDREKMSKS LGNFFTVRDV LKYYDAETVR YFLMSGHYRS  300
QLNY                                                                304

SEQ ID NO: 16            moltype = AA   length = 253
FEATURE                  Location/Qualifiers
source                   1..253
                         mol_type = protein
                         organism = Escherichia coli
SEQUENCE: 16
TNFIRQIIDE DLASGKHTTV HTRFPPEPNG YLHIGHAKSI CLNFGIAQDY KGQCNLRFDD   60
TNPVKEDIEY VESIKNDVEW LGFHWSGNVR YSSDYFDQLH AYAIELINKG LAYVDELTPE  120
QIREYRGTLT QPGKNSPYRD RSVEENLALF EKMRTGGFEE GKACLRAKID MASPFIVMRD  180
PVLYRIKFAE HHQTGNKWCI YPMYDFTHCI SDALEGITHS LCTLEFQDNR RLYDWVLDNI  240
TIPVHPRQYE FSR                                                     253

SEQ ID NO: 17            moltype = AA   length = 309
FEATURE                  Location/Qualifiers
source                   1..309
                         mol_type = protein
                         organism = Escherichia coli
SEQUENCE: 17
IKTRFAPSPT GYLHVGGART ALYSWLFARN HGGEFVLRIE DTDLERSTPE AIEAIMDGMN   60
WLSLEWDEGP YYQTKRFDRY NAVIDQMLEE GTAYKCYCSK ERLEALREEQ MAKGEKPRYD  120
GRCRHSHEHH ADDEPCVVRF ANPQEGSVVF DDQIRGPIEF SNQELDDLII RRTDGSPTYN  180
FCVVVDDWDM EITHVIRGED HINNTPRQIN ILKALNAPVP VYAHVSMING DDGKKLSKRH  240
GAVSVMQYRD DGYLPEALLN YLVRLGWSHG DQEIFTREEM IKYFTLNAVS KSASAFNTDK  300
LLWLNHHYI                                                          309

SEQ ID NO: 18            moltype = AA   length = 767
FEATURE                  Location/Qualifiers
source                   1..767
                         mol_type = protein
                         organism = Escherichia coli
SEQUENCE: 18
FPMRGDLAKR EPGMLARWTD DDLYGIIRAA KKGKKTFILH DGPPYANGSI HIGHSVNKIL   60
KDIIIKSKGL SGYDSPYVPG WDCHGLPIEL KVEQEYGKPG EKFTAAEFRA KCREYAATQV  120
```

```
DGQRKDFIRL GVLGDWSHPY LTMDFKTEAN IIRALGKIIG NGHLHKGAKP VHWCVDCRSA    180
LAEAEVEYYD KTSPSIVAFQ AVDQDALKTK FGVSNVNGPI SLVIWTTTPW TLPANRAISI    240
APDFDYALVQ IDGQAVILAK DLVESMQRIG VSDYTILGTV KGAELELLRF THPFMDFDVP    300
AILGDHVTLD AGTGAVHTAP GHGPDDYVIG QKYGLETANP VGPDGTYLPG TYPTLDGVNV    360
FKANDIVVAL LQEKGALLHV EKMQHSYPCC WRHKTPIIFR ATPQWFVSMD QKGLRAQSLK    420
EIKGVQWIPD WGQARIESMV ANRPDWCISR QRTWGVPMSL FVHKDTEELH PRTLELMEEV    480
AKRVEVDGIQ AWWDLDAKEI LGDEADQYVK VPDTLDVWFD SGSTHSSVVD VRPEFAGHAA    540
DMYLEGSDQH RGWFMSSLMI STAMKGKAPY RQVLTHGFTV DGQGRKMSKS IGNTVSPQDV    600
MNKLGADILR LWVASTDYTG EMAVSDEILK RAADSYRRIN NTARFLLANL NGFDPAKDMV    660
KPEEMVVLDR WAVGCAKAAQ EDILKAYEAY DFHEVVQRLM RFCSVEMGSF YLDIIKDRQY    720
TAKADSVARR SCQTALYHIA EALVRWMAPI LSFTADEVWG YLPGERE                 767

SEQ ID NO: 19              moltype = AA   length = 779
FEATURE                    Location/Qualifiers
source                     1..779
                           mol_type = protein
                           organism = Escherichia coli
SEQUENCE: 19
IESKVQLHWD EKRTFEVTED ESKEKYYCLS MLPYPSGRLH MGHVRNYTIG DVIARYQRML     60
GKNVLQPIGW DAFGLPAEGA AVKNNTAPAP WTYDNIAYMK NQLKMLGFGY DWSRELATCT    120
PEYYRWEQKC FTELYKKGLV YKKTSAVNWC PNDQTVLANE QVIDGCCWRC DTKVERKEIP    180
QWFIKITAYA DELLNDLDKL DHWPDTVKTM QRNWIGRSEG VEITFNVKDY DNTLTVYTTR    240
PDTFMGCTYL AVAAGHPLAQ KAAENNPELA AFIDECRNTK VAEAEMATME KKGVDTGFKA    300
VHPLTGEEIP VWAANFVLME YGTGAVMAVP GHDQRDYEFA SKYGLNIKPV ILAADGSEPD    360
LSQQALTEKG VLFNSGEFNG LDHEAAFNAI ADKLTEMGVG ERKVNYRLRD WGVSRQRYWG    420
APIPMVTLED GTVMPTPDDQ LPVILPEDVV MDGITSPIKA DPEWAKTTVN GMPALRETDT    480
FDTFMESSWY YARYTCPEYK EGMLDSKAAN YWLPVDIYIG GIEHAIMHLL YFRFFHKLMR    540
DAGMVNSDEP AKQLLCQGMV LADAFYYVGE NGERNWVSPV DAIVERDEKG RIVKAKDAAG    600
HELVYTGMSK MSKSKNNGID PQVMVERYGA DTVRLFMMFA SPADMTLEWQ ESGVEGANRF    660
LKRVWKLVYE HTAKGDVAAL NVDALTEDQK ALRRDVHKTI AKVTDDIGRR QTFNTAIAAI    720
MELMNKLAKA PTDGEQDRAL MQEALLAVVR MLNPFTPHIC FTLWQELKGE GDIDNAPWP     779

SEQ ID NO: 20              moltype = AA   length = 328
FEATURE                    Location/Qualifiers
source                     1..328
                           mol_type = protein
                           organism = Escherichia coli
SEQUENCE: 20
ANDKSRQTFV VRSKILAAIR QFMVARGFME VETPMMQVIP GGASARPFIT HHNALDLDMY     60
LRIAPELYLK RLVVGGFERV FEINRNFRNE GISVRHNPEF TMMELYMAYA DYHDLIELTE    120
SLFRTLAQEV LGTTKVTYGE HVFDFGKPFE KLTMREAIKK YRPETDMADL DNFDAAKALA    180
ESIGITVEKS WGLGRIVTEI FDEVAEAHLI QPTFITEYPA EVSPLARRND VNPEITDRFE    240
FFIGGREIGN GFSELNDAED QAERFQEQVN AKAAGDDEAM FYDEDYVTAL EYGLPPTAGL    300
GIGIDRMIML FTNSHTIRDV ILFPAMRP                                      328

SEQ ID NO: 21              moltype = AA   length = 388
FEATURE                    Location/Qualifiers
source                     1..388
                           mol_type = protein
                           organism = Escherichia coli
SEQUENCE: 21
MIRKLASGLY TWLPTGVRVL KKVENIVREE MNNAGAIEVL MPVVQPSELW QESGRWEQYG     60
PELLRIADRG DRPFVLGPTH EEVITDLIRN ELSSYKQLPL NFYQIQTKFR DEVRPRFGVM    120
RSREFLMKDA YSFHTSQESL QETYDAMYAA YSKIFSRMGL DFRAVQADTG SIGGSASHEF    180
QVLAQSGEDD VVFSDTSDYA ANIELAEAIA PKEPRAAATQ EMTLVDTPNA KTIAELVEQF    240
NLPIEKTVKT LLVKAVEGSS FPLVALLVRG DHELNEVKAE KLPQVASPLT FATEEEIRAV    300
VKAGPGSLGP VNMPIPVVID RTVAAMSDFA AGANIDKGHY FGINWDRDVA TPEIADIRNV    360
VAGDPSPDGQ GTLLIKRGIE VGHIFQLG                                      388

SEQ ID NO: 22              moltype = AA   length = 429
FEATURE                    Location/Qualifiers
source                     1..429
                           mol_type = protein
                           organism = Escherichia coli
SEQUENCE: 22
MLDPNLLRNE PDAVAEKLAR RGFKLDVDKL GALEERRKVL QVKTENLQAE RNSRSKSIGQ     60
AKARGEDIEP LRLEVNKLGE ELDAAKAELD ALQAEIRDIA LTIPNLPADE VPVGKDENDN    120
VEVSRWGTPR EFDFEVRDHV TLGEMYSGLD FAAAVKLTGS RFVVMKGQIA RMHRALSQFM    180
LDLHTEQHGY SENYVPYLVN QDTLYGTGQL PKFAGDLFHT RPLEEEADTS NYALIPTAEV    240
PLTNLVRGEI IDEDDLPIKM TAHTPCFRSE AGSYGRDTRG LIRMHQFDKV EMVQIVRPED    300
SMAALEEMTG HAEKVLQLLG LPYRKIILCT GDMGFGACKT YDLEVWIPAQ NTYREISSCS    360
NVWDFQARRM QARCRSKSDK KTRLVHTLNG SGLAVGRTLV AVMENYQQAD GRIEVPEVLR    420
PYMNGLEYI                                                           429

SEQ ID NO: 23              moltype = AA   length = 401
FEATURE                    Location/Qualifiers
source                     1..401
                           mol_type = protein
                           organism = Escherichia coli
```

```
SEQUENCE: 23
RDHRKIGKQL DLYHMQEEAP GMVFWHNDGW TIFRELEVFV RSKLKEYQYQ EVKGPFMMDR    60
VLWEKTGHWD NYKDAMFTTS SENREYCIKP MNCPGHVQIF NQGLKSYRDL PLRMAEFGSC   120
HRNEPSGSLH GLGRVRGFTQ DDAHIFCTEE QIRDEVNGCI RLVYDMYSTF GFEKIVVKLS   180
TRPEKRIGSD EMWDRAEADL AVALEENNIP FEYQLGEGAF YGPKIEFTLY DCLDRAAQCG   240
TVQLDFSLPS RLSASYVGED NERKVPVMIH RAILGSMEVF IGILTEEFAG FFPTWLAPVQ   300
VVIMNITDSQ SEYVNELTQK LSNAGIRVKA DLRNEKIGFK IREHTLRRVP YMLVCGDKEV   360
ESGKVAVRTR RGKDLGSMDV NEVIEKLQQE IRSRSLKQLE E                      401

SEQ ID NO: 24            moltype = AA  length = 264
FEATURE                  Location/Qualifiers
source                   1..264
                         mol_type = protein
                         organism = Escherichia coli
SEQUENCE: 24
MTKPIVFSGA QPSGELTIGN YMGALRQWIN MQDDYHCIYC IVDQHAITVR QDAQKLRKAT    60
LDTLALYLAC GIDPEKSTIF VQSHVPEHAQ LGWALNCYTY FGELSRMTQF KDKSARYAEN   120
INAGLFDYPV LMAADILLYQ TNLVPVGEDQ KQHLELSRDI AQRFNALYGD IFKVPEPFIP   180
KSGARVMSLL EPTKKMSKSD DNRNNVIGLL EDPKSVVKKI KRAVTDSDEP PVVRYDVQNK   240
AGVSNLLDIL SAVTGQSIPE LEKQ                                         264

SEQ ID NO: 25            moltype = AA  length = 424
FEATURE                  Location/Qualifiers
source                   1..424
                         mol_type = protein
                         organism = Escherichia coli
SEQUENCE: 25
MASSNLIKQL QERGLVAQVT DEEALVERLA QGPIALYCGF DPTADSLHLG HLVPLLCLKR    60
FQQAGHKPVA LVGGATGLIG DPSFKAAERK LNTEETVQEW VDKIRKQVAP FLDFDCGENS   120
AIAANNYDWF GNMNVLTFLR DIGKHFSVNQ MINKEAVKQR LNREDQGISF TEFSYNLLQG   180
YDFACLNKQY GVVLQIGGSD QWGNITSGID LTRRLHQNQV FGLTVPLITK ADGTKFGKTE   240
GGAVWLDPKK TSPYKFYQFW INTADADVYR FLKFFTFMSI EEINALEEED KNSGKAPRAQ   300
YVLAEQVTRL VHGEEGLQAA KRITECLFSG SLSALSEADF EQLAQDGVPM VKMEKGADLM   360
QALVDSELQP SRGQARKTIA SNAITINGEK QSDPEYFFKE EDRLFGRFTL LRRGKKNYCL   420
ICWK                                                               424

SEQ ID NO: 26            moltype = AA  length = 763
FEATURE                  Location/Qualifiers
source                   1..763
                         mol_type = protein
                         organism = Escherichia coli
SEQUENCE: 26
MEKTYNPQDI EQPLYEHWEK QGYFKPNGDE SQESFCIMIP PPNVTGSLHM GHAFQQTIMD    60
TMIRYQRMQG KNTLWQVGTD HAGIATQMVV ERKIAAEEGK TRHDYGREAF IDKIWEWKAE   120
SGGTITRQMR RLGNSVDWER ERFTMDEGLS NAVKEVFVRL YKEDLIYRGK RLVNWDPKLR   180
TAISDLEVEN RESKGSMWHI RYPLADGAKT ADGKDYLVVA TTRPETLLGD TGVAVNPEDP   240
RYKDLIGKYV ILPLVNRRIP IVGDEHADME KGTGCVKITP AHDFNDYEVG KRHALPMINI   300
LTFDGDIRES AQVFDTKGNE SDVYSSEIPA EFQKLERFAA RKAVVAAIDA LGLLEEIKPH   360
DLTVPYGDRG GVVIEPMLTD QWYVRADVLA KPAVEAVENG DIQFVPKQYE NMYFSWMRDI   420
QDWCISRQLW WGHRIPAWYD EAGNVYVGRN EEEVRKENNL GADVALRQDE DVLDTWFSSA   480
LWTFSTLGWP ENTDALRQFH PTSVMVSGFD IIFFWIARMI MMTMHFIKDE NGKPQVPFNT   540
VYMTGLIRDD EGQKMSKSKG NVIDPLDMVD GISLPELLEK RTGNMMQPQL ADKIRKRTEK   600
QFPNGIEPHG TDALRFTLAA LASTGRDINW DMKRLEGYRN FCNKLWNASR FVLMNTEGQD   660
CGFNGGEMTL SLADRWILAE FNQTIKAYRE ALDSFRFDIA AGILYEFTWN QFCDWYLELT   720
KPVMNGGTEA ELRGTRHTLV TVLEGLLRLA HPIIPFITET IWQ                    763

SEQ ID NO: 27            moltype = AA  length = 287
FEATURE                  Location/Qualifiers
source                   1..287
                         mol_type = protein
                         organism = Methanococcus jannaschii
SEQUENCE: 27
MDEFEMIKRN TSEIISELRE VLKKDEKSAL IGFEPSGKIH LGHYLQKKMI DLQNAGFDII    60
IPLADLHAYL NQKGELDEIR KIGDYNKKVF EAMLKAKYVY GSEFQLDKYT LNVYRLALKT   120
TLKARRSMEL IAREDENPVA EVIYPIMQVN GCHYKGVDVA VGGMEQRKIM LARELLPKKV   180
VCIHPVLTGL DGEGKMSSSG NFIAVDDSPE EIRAFKKAYC PAGVVEGNPE IAKYFLEYPL   240
TIKPEKFGGD LTVNSYEESL FKNKELHPMD LKAVAEELIK ILEPIRK                287

SEQ ID NO: 28            moltype = AA  length = 539
FEATURE                  Location/Qualifiers
source                   1..539
                         mol_type = protein
                         organism = Methanococcus jannaschii
SEQUENCE: 28
MRFDPEKIKK DAKENFDLTW NEGKKMVKTP TLNERYPRTT FRYGKAHPVY DTIQKLREAY    60
LRMGFEEMMN PLIVDEKEVH KQFGSEALAV LDRCFYLAGL PRPNVGISDE RIAQINGILG   120
DIGDEGIDKV RKVLHAYKKG KVEGDDLVPE ISAALEVSDA LVADMIEKVF PEFKELVAQA   180
STKTLRSHMT SGWFISLGAL LERKEPPFHF FSIDRCFRRE QQEDASRLMT YYSASCVIMD   240
ENVTVDHGKA VAEGLLSQFG FEKFLFRPDE KRSKYYVPDT QTEVFAFHPK LVGSNSKYSD   300
```

```
                                           -continued
GWIEIATFGI YSPTALAEYD IPCPVMNLGL GVERLAMILH DAPDIRSLTY PQIPQYSEWE  360
MSDSELAKQV FVDKTPETPE GREIADAVVA QCELHGEEPS PCEFPAWEGE VCGRKVKVSV  420
IEPEENTKLC GPAAFNEVVT YQGDILGIPN TKKWQKAFEN HSAMAGIRFI EAFAAQAARE  480
IEEAAMSGAD EHIVRVRIVK VPSEVNIKIG ATAQRYITGK NKKIDMRGPI FTSAKAEFE   539

SEQ ID NO: 29           moltype = AA  length = 215
FEATURE                 Location/Qualifiers
source                  1..215
                        mol_type = protein
                        organism = Trypanosoma cruzi
SEQUENCE: 29
APAAVDWRAR GAVTAVKDSG QCGSGWAFAA IGNVECQWFL AGHPLTNLSE QMLVSCDKTD  60
SGCSSGLMDN AFEWIVQENN GAVYTEDSYP YASATGISPP CTTSGHTVGA TITGHVELPQ  120
DEAQIAAWLA VNGPVAVCVD ASSWMTYTGG VMTSCVSESY DHGVLLVGYN DSHKVPYWII  180
KNSWTTQWGE EGYIRIAKGS NQCLVKEEAS SAVVG                            215

SEQ ID NO: 30           moltype = AA  length = 215
FEATURE                 Location/Qualifiers
source                  1..215
                        mol_type = protein
                        organism = Trypanosoma cruzi
SEQUENCE: 30
APAAVDWRAR GAVTAVKDQG QCGSCWAFSA IGNVECQWFL AGHPLTNLSE QMLVSCDKTD  60
SGCSGGLMNN AFEWIVQENN GAVYTEDSYP YASGEGISPP CTTSGHTVGA TITGHVELPQ  120
DEAQIAAWLA VNGPVAVAVD ASSWMTYTGG VMTSCVSEQL DHGVLLVGYN DSAAVPYWII  180
KNSWTTQWGE EGYIRIAKGS NQCLVKEEAS SAVVG                            215
```

MOLECULES AND METHODS FOR ITERATIVE POLYPEPTIDE ANALYSIS AND PROCESSING

REFERENCE TO RELATED APPLICATIONS

This application is a continuation of U.S. patent application Ser. No. 17/088,898, filed Nov. 4, 2020, which is a continuation of U.S. patent application Ser. No. 16/907,813, filed Jun. 22, 2020 (issued as U.S. Pat. No. 10,852,305 on Dec. 1, 2020), which is a continuation of U.S. patent application Ser. No. 15/255,433, filed Sep. 2, 2016, now abandoned, which is a division of U.S. patent application Ser. No. 14/211,448, filed Mar. 14, 2014, (issued as U.S. Pat. No. 9,435,810 on Sep. 6, 2016), which claims the benefit of U.S. Provisional Application No. 61/798,705, filed Mar. 15, 2013, the entire disclosures of which are incorporated herein by reference.

GOVERNMENT LICENSE RIGHTS

This invention was made with government support under GM101602 awarded by the National Institutes of Health. The government has certain rights in the invention.

INCORPORATION OF SEQUENCE LISTING XML

A computer readable form of the Sequence Listing XML containing the file named "WSTL12926.US5 Sequence Listing.xml," which is 38,341 bytes in size (as measured in MICROSOFT WINDOWS® EXPLORER) and was created on Nov. 29, 2023, is provided herein and is herein incorporated by reference. This Sequence Listing consists of SEQ ID NOs: 1-30.

FIELD OF THE INVENTION

The present invention generally relates to reagents and methods for the digital analysis of proteins or peptides. Specifically provided herein are proteins for identifying the N-terminal amino acid or N-terminal phosphorylated amino acid of a polypeptide. Another aspect of the invention is an enzyme for use in the cleavage step of the Edman degradation reaction and a method for using this enzyme.

BACKGROUND OF THE INVENTION

Proteins carry out the majority of signaling, metabolic, and regulatory tasks necessary for life. As a result, a quantitative description of the proteomic state of cells, tissues, and fluids is crucial for assessing the functionally relevant differences between diseased and unaffected tissues, between cells of different lineages or developmental states, and between cells executing different regulatory programs. Although powerful high-throughput techniques are available for determining the RNA content of a biological sample, the correlation between mRNA and protein levels is low (1).

The preferred method for proteomic characterization is currently mass spectrometry. Despite its many successes, mass spectrometry possesses limitations. One limitation is quantification. Because different proteins ionize with different efficiencies, it is difficult to compare relative amounts between two samples without isotopic labeling (2). In 'shotgun' strategies for analyzing complex samples, the uncertainties of peptide assignment further complicate quantification, especially for low abundance proteins (3). A second limitation of mass spectrometry is its dynamic range. For unbiased samples that have not undergone prefractionation or affinity purification, the dynamic range in analyte concentration is roughly $10^2$-$10^3$, depending upon the instrument (4). This is problematic for complex samples such as blood, where two proteins whose levels are measured in clinical laboratories (albumin and interleukin-6) can differ in abundance by $10^{10}$ (5). Another limitation is the analysis of phosphopeptides, due to the loss of phosphate in some ionization modes. The power of proteomic approaches would increase dramatically with the introduction of a more quantitative high-throughput assay possessing greater dynamic range.

One promising technology for the analysis of proteins in a sensitive and quantitative manner was developed by Mitra et al (7). This technology, referred to as Digital Analysis of Proteins by End Sequencing or DAPES, features a method for single molecule protein analysis. To perform DAPES, a large number (ca. 109) of protein molecules are denatured and cleaved into peptides. These peptides are immobilized on a nanogel surface applied to the surface of a microscope slide and their amino acid sequences are determined in parallel using a method related to Edman degradation. Phenyl isothiocyanate (PITC) is added to the slide and reacts with the N-terminal amino acid of each peptide to form a stable phenylthiourea derivative. Next, the identity of the N-terminal amino acid derivative is determined by performing, for example, 20 rounds of antibody binding with antibodies specific for each PITC-derivatized N-terminal amino acid, detection, and stripping. The N-terminal amino acid is removed by raising the temperature or lowering pH, and the cycle is repeated to sequence 12-20 amino acids from each peptide on the slide. The absolute concentration of every protein in the original sample can then be calculated based on the number of different peptide sequences observed.

The phenyl isothiocyanate chemistry used in DAPES is the same used in Edman degradation and is efficient and robust (>99% efficiency). However, the cleavage of single amino acids requires strong anhydrous acid or alternatively, an aqueous buffer at elevated temperatures. Cycling between either of these harsh conditions is undesirable for multiple rounds of analysis on sensitive substrates used for single molecule protein detection (SMD). Thus, there is a need in the art for improved reagents and methods for the parallel analysis of peptides in single molecule protein detection (SMD) format.

SUMMARY OF THE INVENTION

One aspect of the invention is an improved method for single molecule sequencing of proteins or peptides. Generally, the method for sequencing a polypeptide, the method comprises (a) contacting the polypeptide with one or more fluorescently labeled N-terminal amino acid binding proteins (NAABs); (b) detecting fluorescence of a NAAB bound to an N-terminal amino acid of the polypeptide; (c) identifying the N-terminal amino acid of the polypeptide based on the fluorescence detected; (d) removing the NAAB from the polypeptide; (e) optionally repeating steps (a) through (d); (f) cleaving the N-terminal amino acid of the polypeptide via Edman degradation; and (g) repeating steps (a) through (f) one or more times.

The present invention also generally relates to reagents for the digital analysis of proteins or peptides. Specifically provided herein are proteins for identifying the N-terminal amino acid or N-terminal phosphorylated amino acid of a polypeptide.

Another aspect of the invention relates to an enzyme for use in the cleavage step of the Edman degradation reaction and a method for using this enzyme. Generally, the enzymatic Edman degradation method comprises reacting the N-terminal amino acid of the polypeptide with phenyl isothiocyanate (PITC) to form a PITC-derivatized N-terminal amino acid and cleaving the PITC-derivatized N-terminal amino acid using an Edman degradation enzyme.

Other objects and features will be in part apparent and in part pointed out hereinafter.

DESCRIPTION OF THE INVENTION

Figure 1:
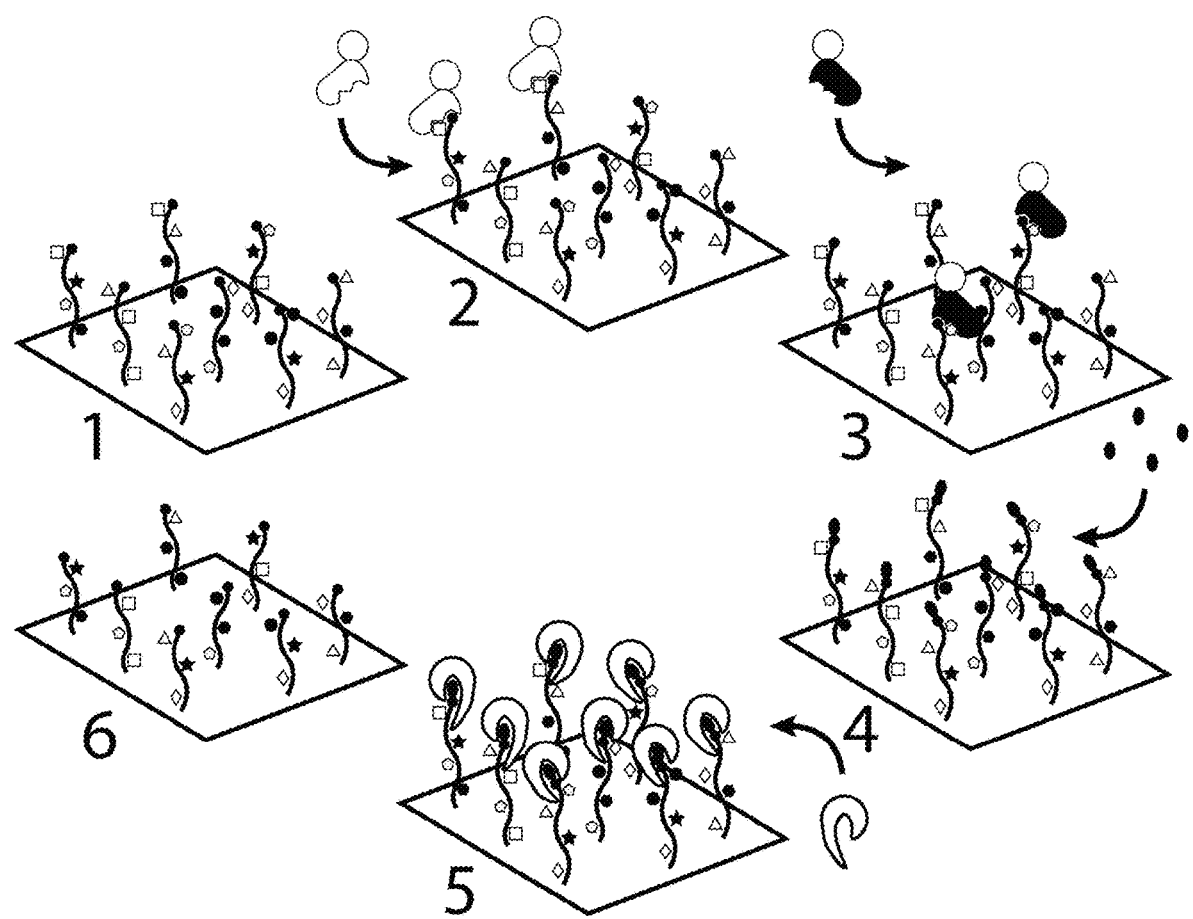
FIG. 1 depicts the Digital Analysis of Proteins by End Sequencing Protocol (DAPES) utilizing N-terminal amino acid binding proteins in the identification step and a synthetic enzyme in the cleavage step.

In one aspect, the present invention is directed to a method and reagents for sequencing a polypeptide. In particular, the present invention provides methods and reagents for the single-molecule, high-throughput sequencing of polypeptides. Recent advances in single-molecule protein detection (SMD) allow for the parallel analysis of large numbers of individual proteins utilizing digital protocols. In accordance with the present invention, reagents capable of specifically binding to N-terminal amino acids for an identification step are provided.

The present invention also includes methods and reagents for identification phosphorylated N-terminal amino acids. Quantitatively interrogating peptide sequences in neutral aqueous environments allows for the possibility of proteomic analyses complementary to those afforded by mass spectrometry. The N-terminal amino acids specific for phosphorylated forms of amino acids allow for quantitative comparison of proteomic inventories and signal transduction cascades in different samples.

In another aspect, the present invention is directed to a method and reagents for enzymatic Edman degradation (i.e., for enzymatically cleaving the N-terminal amino group of a polypeptide). In accordance with this aspect, a synthetic enzyme is provided that catalyzes the cleavage step of the Edman degradation reaction in an aqueous buffer and at neutral pH, thereby providing an alternative to the harsh chemical conditions typically employed in Edman degradation.

Yet another aspect of the present invention is directed to an integrated high-throughput method for sequencing of polypeptides that includes use of reagents capable of specifically binding to N-terminal amino acids for an identification step and use of an enzymatic Edman degradation to remove N-terminal amino acids.

I. N-terminal Amino Acids Binders (NAABs)

In accordance with the present invention, reagents capable of specifically binding to N-terminal amino acids are provided. In various aspects of the invention, the N-terminal amino acid binders (NAABs) each selectively bind to a particular amino acid, for example one of the twenty standard naturally occurring amino acids. The standard, naturally-occurring amino acids include Alanine (A or Ala), Cysteine (C or Cys), Aspartic Acid (D or Asp), Glutamic Acid (E or Glu), Phenylalanine (F or Phe), Glycine (G or Gly), Histidine (H or His), Isoleucine (I or Ile), Lysine (K or Lys), Leucine (L or Leu), Methionine (M or Met), Asparagine (N or Asn), Proline (P or Pro), Glutamine (Q or Gln), Arginine (R or Arg), Serine (S or Ser), Threonine (T or Thr), Valine (V or Val), Tryptophan (W or Trp), and Tyrosine (Y or Tyr).

The NAABs of the present invention can be made by modifying various naturally occurring proteins to introduce one or more mutations in the amino acid sequence to produce engineered proteins that bind to particular N-terminal amino acids. For example, aminopeptidases or tRNA synthetases can be modified to create NAABs that selectively bind to particular N-terminal amino acids.

A. eLAP

For example, a NAAB that binds specifically to N-terminal leucine residues has been developed by introducing mutations into E. coli methionine aminopeptidase (eMAP). This NAAB (eLAP) has 19 amino acid substitutions as compared to wild-type eMAP. In particular, eLAP has substitutions at the amino acid positions corresponding to positions 42, 46, 56-60, 62, 63, 65-70, 81, 101, 177, and 221 of wild-type eMAP. In eLAP, the aspartate at position 42 of eMAP is replaced with a glutamate, the asparagine at position 46 of eMAP is replaced with a tryptophan, the valine at position 56 of eMAP is replaced with a threonine, the serine at position 57 of eMAP is replaced with an aspartate, the alanine at position 58 of eMAP is replaced with a serine, the cysteine at position 59 of eMAP is replaced with a leucine, the leucine at position 60 of eMAP is replaced with a threonine, the tyrosine at position 62 of eMAP is replaced with a histidine, the histidine at position 63 of eMAP is replaced with an asparagine, the tyrosine at position 65 of eMAP is replaced with a isoleucine, the proline at position 66 of eMAP is replaced with an aspartate, the lysine at position 67 of eMAP is replaced with a glycine, the serine at position 68 of eMAP is replaced with a histidine, the valine at position 69 of eMAP is replaced with a glycine, the cysteine at position 70 of eMAP is replaced with a serine, the isoleucine at position 81 of eMAP is replaced with a valine, the isoleucine at position 101 of eMAP is replaced with an arginine, the phenylalanine at position 177 of eMAP is replaced with a histidine, and the tryptophan at position 221 of eMAP is replaced with a serine. Alternative substitutions could be made at selected positions. For example, valine at 56 could be replaced instead by serine, leucine at 60 could be replaced instead by serine, tyrosine at 65 could be replaced instead by valine, cysteine at 70 could be replaced instead by threonine, and tryptophan at 221 could be replaced instead by threonine.

Accordingly, one reagent in accordance with the present invention comprises an isolated, synthetic, or recombinant NAAB comprising an amino acid sequence having a glutamate residue at a position corresponding to position 42 of wild-type *E. coli* methionine aminopeptidase (eMAP) (SEQ ID NO: 1), a tryptophan residue at a position corresponding to position 46 of wild-type eMAP, a threonine or serine residue at a position corresponding to position 56 of wild-type eMAP, an aspartate residue at a position corresponding to position 57 of wild-type eMAP, a serine residue at a position corresponding to position 58 of wild-type eMAP, a leucine residue at a position corresponding to position 59 of wild-type eMAP, a threonine or serine residue at a position corresponding to position 60 of wild-type eMAP, a histidine residue at a position corresponding to position 62 of wild-type eMAP, an asparagine residue at a position corresponding to position 63 of wild-type eMAP, a isoleucine or valine residue at a position corresponding to position 65 of wild-type eMAP, an aspartate residue at a position corresponding to position 66 of wild-type eMAP, a glycine residue at a position corresponding to position 67 of wild-type eMAP, a histidine residue at a position corresponding to position 68 of wild-type eMAP, a glycine residue at a position corresponding to position 69 of wild-type eMAP, a serine or threonine residue at a position corresponding to position 70 of wild-type eMAP, a valine residue at a position corresponding to position 81 of wild-type eMAP, an arginine residue at a position corresponding to position 101 of wild-type eMAP, a histidine residue at a position corresponding to position 177 of wild-type eMAP, and a serine or threonine residue at a position corresponding to position 221 of wild-type eMAP.

The remaining amino acid sequence of the NAAB comprises a sequence similar to that of wild-type eMAP, but which may contain additional amino acid mutations (including deletions, insertions, and/or substitutions), so long as such mutations do not significantly impair the ability of the NAAB to selectively bind to N-terminal leucine residues. For example, the remaining amino acid sequence can comprise an amino acid sequence having at least about 80% sequence identity to the amino acid sequence of wild-type eMAP (SEQ ID NO: 1), or at least 85%, at least 90%, at least 93%, at least 95%, at least 96%, at least 97%, at least 98%, at least 99%, or 100% sequence identity to the amino acid sequence of SEQ ID NO: 1.

In some aspects of the present invention, the NAAB comprises the amino acid sequence of SEQ ID NO: 2. For example, the NAAB can consist of the amino acid sequence of SEQ ID NO: 2.

The NAAB preferably selectively binds to N-terminal leucine residues with at least about a 1.5:1 ratio of specific to non-specific binding, more preferably about a 2:1 ratio of specific to non-specific binding. Non-specific binding refers to background binding, and is the amount of signal that is produced when the amino acid target of the NAAB is not present at the N-terminus of an immobilized peptide.

B. tRNA Synthetase-Based NAABs

1. N-Terminal Methionine Binding Protein

NAABs can also be made by introducing mutations into class I and class II tRNA synthetases (RSs). NAABs for use in the polypeptide sequencing processes described herein should possess high affinity and specificity for amino acids at the N-terminus of peptides. Because tRNA synthetases have intrinsic specificity for free amino acids, they are useful scaffolds for developing NAABs for use in protein sequencing. The inherent specificity of these scaffold proteins is retained, while broadening the binding capabilities of these proteins from free monomers to peptides, and removing unnecessary domains or functions. The Protein Data Bank contains multiple crystal structures for RSs specific for all twenty canonical amino acids. Moreover, unlike other classes of amino acid binding molecules, such as riboswitches, RSs do not envelop the entire amino acid, as the C-terminus must be available for adenylation. The binding pocket in these molecules can be modified to permit the entry of peptides presenting the specifically bound amino acid. This results in a complete set of engineered RS fragments that can bind to their cognate amino acids at the N-termini of peptides.

The class I RS proteins form a distinct structural family that is identified by sequence homology and has been extensively characterized both biochemically and biophysically. RS proteins possess a modular architecture, and the domains conferring specificity for a particular amino acid are readily identified (18). Several types of mutations to improve the performance of the amino acid binding domain of an RS as a NAAB can be introduced. First, one or more mutations can be introduced into the binding domain to lock the domain into the bound conformation, eliminating the energetic cost of any induced conformational change (16). Second, one or more mutations can be introduced to widen the binding pocket for the amino acid, making room for entry of a peptide. This approach can be used for each of the RS proteins.

For example, mutations can be introduced into methionyl-tRNA synthetase (MetRS) from *E. coli* to create a NAAB that binds specifically to N-terminal methionine residues. This NAAB comprises a truncated version of wild-type *E. coli* MetRS (residues 4-547; SEQ ID NO: 3) having four substitution mutations as compared to the wild-type sequence (SEQ ID NO: 5). The sequence of this N-terminal methionine-specific NAAB is provided by SEQ ID NO: 4. In particular, in the methionine-specific NAAB, the leucine at position 13 of wild-type *E. coli* MetRS is replaced with a serine (L13S), the phenylalanine at position 260 is replaced with a leucine (Y260L), the aspartic acid at position 296 is replaced with a glycine (D296G), and the histidine at position 301 is replaced with a leucine (H301L).

Accordingly, one reagent in accordance with the present invention comprises an isolated, synthetic, or recombinant NAAB comprising an amino acid sequence having a serine residue at a position corresponding to position 13 of wild-type E. coli methionyl-tRNA synthetase (MetRS); a leucine residue at a position corresponding to position 260 of wild-type E. coli MetRS; a glycine residue at a position corresponding to position 296 of wild-type E. coli MetRS; and a leucine residue at a position corresponding to position 301 of wild-type E. coli MetRS.

The remaining amino acid sequence of the NAAB comprises a sequence similar to that of amino acids 4-547 of wild-type MetRS, but may contain additional amino acid mutations (including deletions, insertions, and/or substitutions), so long as such mutations do not significantly impair the ability of the NAAB to selectively bind to N-terminal methionine residues. For example, the remaining amino acid sequence can comprise an amino acid sequence having at least about 80% sequence identity to the amino acid sequence of SEQ ID NO: 3, or at least 85%, at least 90%, at least 93%, at least 95%, at least 96%, at least 97%, at least 98%, at least 99%, or 100% sequence identity to the amino acid sequence of SEQ ID NO: 3.

In certain aspects of the invention, the NAAB comprises the amino acid sequence of SEQ ID NO: 4. For example, the NAAB can consist of the amino acid sequence of SEQ ID NO: 4.

The NAAB preferably selectively binds to N-terminal methionine residues with at least about a 2:1 ratio of specific to non-specific binding, more preferably at least about a 7:1 ratio, at least about a 10:1 ratio, or about a 13:1 ratio of specific to non-specific binding.

2. N-Terminal Phenylalanine Binding Protein

The starting point for the phenylalanine NAAB (Phe NAAB) was the phenylalanine-tRNA synthetase (PheRS) from *Thermus Thermophilus*, for which a crystal structure is available. Normally the operational unit is a tetramer with two copies each of two separate proteins. Only one of the proteins has the amino acid binding specificity, so a model was made of one copy of the protein in isolation. The N-terminus of the protein was truncated, which exposed a significant amount of surface area that was previously buried in contacts with other proteins. This surface was hydrophobic, and mutations were made the surface to make the protein stabile and soluble as a monomer. Tighter binding of the mutant to peptides was observed when compared to the wild-type protein.

For example, mutations can be introduced into PheRS from *Thermus Thermophilus* to create a NAAB that binds specifically to N-terminal phenylalanine residues. This NAAB comprises a truncated version of wild-type *Thermus Thermophilus* PheRS (residues 86-350; SEQ ID NO: 6) having 22 substitution mutations as compared to the wild-type sequence. The sequence of this N-terminal phenylalanine-specific NAAB is provided by SEQ ID NO: 7. In particular, PheNAAB has substitutions at the amino acid positions corresponding to positions 100, 142, 143, 152-154, 165, 205, 212, 228-232, 234, 257, 287, 289, 303, 336, 338, 340 of wild-type PheRS. In the NAAB, the leucine at position 100 of PheRS is replaced with an aspartate, the histidine at position 142 of PheRS is replaced with an asparagine, the histidine at position 143 of PheRS is replaced with a glycine, the phenylalanine at position 152 of PheRS is replaced with a valine, the tryptophan at position 153 of PheRS is replaced with a glycine, the leucine at position 154 of PheRS is replaced with a lysine, the leucine at position 165 of PheRS is replaced with an aspartate, the phenylalanine at position 205 of PheRS is replaced with an alanine, the histidine at position 212 of PheRS is replaced with an alanine, the isoleucine at position 228 of PheRS is replaced with a valine, the alanine at position 229 of PheRS is replaced with an asparagine, the methionine at position 230 of PheRS is replaced with a glutamate, the alanine at position 231 of PheRS is replaced with a glycine, the histidine at position 232 of PheRS is replaced with an aspartate, the lysine at position 234 of PheRS is replaced with a tyrosine, the tyrosine at position 257 of PheRS is replaced with a threonine, the histidine at position 287 of PheRS is replaced with a glycine, the lysine at position 289 of PheRS is replaced with an asparagine, the leucine at position 303 of PheRS is replaced with an aspartate, the phenylalanine at position 336 of PheRS is replaced with an alanine, the glycine at position 338 of PheRS is replaced with a threonine, and the leucine at position 340 of PheRS is replaced with a glycine.

Accordingly, one reagent in accordance with the present invention comprises an isolated, synthetic, or recombinant NAAB comprising an amino acid sequence having a an aspartate residue at a position corresponding to position 100 of wild-type PheRS from *Thermus Thermophilus* (SEQ ID NO: 8), an asparagine residue at a position corresponding to position 142 of wild-type PheRS, a glycine residue at a position corresponding to position 143 of wild-type PheRS, a valine residue at a position corresponding to position 152 of wild-type PheRS, a glycine residue at a position corresponding to position 153 of wild-type PheRS, a lysine residue at a position corresponding to position 154 of wild-type PheRS, an aspartate residue at a position corresponding to position 165 of wild-type PheRS, an alanine residue at a position corresponding to position 205 of wild-type PheRS, an alanine residue at a position corresponding to position 212 of wild-type PheRS, a valine residue at a position corresponding to position 228 of wild-type PheRS, an asparagine residue at a position corresponding to position 229 of wild-type PheRS, a glutamate residue at a position corresponding to position 230 of wild-type PheRS, a glycine residue at a position corresponding to position 231 of wild-type PheRS, an aspartate residue at a position corresponding to position 232 of wild-type PheRS, a tyrosine residue at a position corresponding to position 234 of wild-type PheRS, a threonine residue at a position corresponding to position 257 of wild-type PheRS, a glycine residue at a position corresponding to position 287 of wild-type PheRS, an asparagine residue at a position corresponding to position 289 of wild-type PheRS, an aspartate residue at a position corresponding to position 303 of wild-type PheRS, an alanine residue at a position corresponding to position 336 of wild-type PheRS, a threonine residue at a position corresponding to position 338 of wild-type PheRS, and a glycine residue at a position corresponding to position 340 of wild-type PheRS.

The remaining amino acid sequence of the NAAB comprises a sequence similar to that of wild-type PheRS, but which may contain additional amino acid mutations (including deletions, insertions, and/or substitutions), so long as such mutations do not significantly impair the ability of the NAAB to selectively bind to N-terminal phenylalanine residues. For example, the remaining amino acid sequence can comprise an amino acid sequence having at least about 80% sequence identity to the amino acid sequence of truncated wild-type PheRS (SEQ ID NO: 6), or at least 85%, at least 90%, at least 93%, at least 95%, at least 96%, at least 97%, at least 98%, at least 99%, or 100% sequence identity to the amino acid sequence of SEQ ID NO:6.

In some aspects of the present invention, the NAAB comprises the amino acid sequence of SEQ ID NO: 7. For example, the NAAB can consist of the amino acid sequence of SEQ ID NO: 7.

The NAAB preferably selectively binds to N-terminal phenylalanine residues with at least about a 1.5:1 ratio of specific to non-specific binding, more preferably about a 2:1 ratio of specific to non-specific binding.

3. N-Terminal Histidine Binding Protein

The starting point for the histidine NAAB (His NAAB) was the histidine-tRNA synthetase (HisRS) from *E. coli*, for which a crystal structure is available. The fragment of wild-type HisRS from 1-320 was shown to be monomeric by others. After inspecting the crystal structure, further residues were truncated from both ends. The initial fragment tested has from Lysine3 to Alanine180. Protein design was conducted to replace a long loop near the binding site with a shorter loop that would create a more open pocket and result in tighter binding to N-terminal histidine residues. This involved the removal of 7 residues (from Arginine113 to Lysine119) and two mutations wherein the arginine at position 121 of HisRS is replaced with an asparagine, and the tyrosine at position 122 of HisRS is replaced with an alanine. Thus, thus this NAAB comprises a truncated version of wild-type *E. coli* HisRS (residues 3-180; SEQ ID NO: 10) having two substitution mutations as compared to the wild-type sequence. The sequence of this N-terminal histidine-specific NAAB is provided by SEQ ID NO: 9.

Accordingly, one reagent in accordance with the present invention comprises an isolated, synthetic, or recombinant NAAB comprising an amino acid sequence having an asparagine residue at a position corresponding to position 121 of wild-type HisRS from *E. coli* (SEQ ID NO: 9) and an alanine residue at a position corresponding to position 122 of wild-type HisRS.

The remaining amino acid sequence of the NAAB comprises a sequence similar to that of wild-type HisRS, but which may contain additional amino acid mutations (including deletions, insertions, and/or substitutions), so long as such mutations do not significantly impair the ability of the NAAB to selectively bind to N-terminal histidine residues. For example, the remaining amino acid sequence can comprise an amino acid sequence having at least about 80% sequence identity to the amino acid sequence of wild-type HisRS (SEQ ID NO: 9), or at least 85%, at least 90%, at least 93%, at least 95%, at least 96%, at least 97%, at least 98%, at least 99%, or 100% sequence identity to the amino acid sequence of SEQ ID NO: 9.

In some aspects of the present invention, the NAAB comprises the amino acid sequence of SEQ ID NO: 10. For example, the NAAB can consist of the amino acid sequence of SEQ ID NO: 10.

The NAAB preferably selectively binds to N-terminal histidine residues with at least about a 1.5:1 ratio of specific to non-specific binding, more preferably about a 2:1 ratio of specific to non-specific binding.

4. Other NAABs

Full-length or truncated fragments from wild-type synthetases from *E. coli* may be used as NAABs for the remaining amino acids. See Table A for the sequences of each of the NAABs. Accordingly, in some aspects of the present invention, the NAAB comprises an amino acid sequence selected from the group consisting of SEQ ID NO: 11; SEQ ID NO: 12; SEQ ID NO: 13; SEQ ID NO: 14; SEQ ID NO: 15; SEQ ID NO: 16; SEQ ID NO: 17; SEQ ID NO: 18; SEQ ID NO: 19; SEQ ID NO: 20; SEQ ID NO: 21; SEQ ID NO: 22; SEQ ID NO: 23; SEQ ID NO: 24; SEQ ID NO: 25; SEQ ID NO: 26; SEQ ID NO: 27; and SEQ ID NO: 28. In various embodiments, a set of NAABs comprises at least 2, 3, 4, 5, 6, 7, 8, 9, 10, 11, 12, 13, 14, 15 or more of the amino acid sequences of SEQ ID NO: 2; SEQ ID NO: 4; SEQ ID NO: 7; SEQ ID NO: 10; SEQ ID NO: 11; SEQ ID NO: 12; SEQ ID NO: 13; SEQ ID NO: 14; SEQ ID NO: 15; SEQ ID NO: 16; SEQ ID NO: 17; SEQ ID NO: 18; SEQ ID NO: 19; SEQ ID NO: 20; SEQ ID NO: 21; SEQ ID NO: 22; SEQ ID NO: 23; SEQ ID NO: 24; SEQ ID NO: 25; SEQ ID NO: 26; SEQ ID NO: 27; and SEQ ID NO: 28. For example, a set of NAABs comprises of the amino acid sequences of SEQ ID NO: 2; SEQ ID NO: 4; SEQ ID NO: 7; SEQ ID NO: 10; SEQ ID NO: 11; SEQ ID NO: 12; SEQ ID NO: 13; SEQ ID NO: 14; SEQ ID NO: 15; SEQ ID NO: 16; SEQ ID NO: 17; SEQ ID NO: 18; SEQ ID NO: 19; SEQ ID NO: 20; SEQ ID NO: 21; SEQ ID NO: 22; SEQ ID NO: 23; SEQ ID NO: 24; SEQ ID NO: 25; SEQ ID NO: 26; SEQ ID NO: 27; and SEQ ID NO: 28.

C. NAABs for PITC-Derivatized Lysine

The phenyl isothiocyanate (PITC) reagent used to activate peptide N-termini for stepwise degradation also reacts with the Nε atom in the lysine side chain. As a result, domains derived from lysine RNA synthetase (LysRS) proteins cannot be used for specific recognition of modified lysine. A NAAB that is specific for PITC-derivatized lysine is therefore required. The class II RS for pyrrolysine (PylRS) served as a starting point for development. Pyrrolysine is a lysine derivative that possesses a pyrrole ring attached to the Nε atom by an amide linkage (Structure A). Crystal structures have been determined for PylRS bound to several ligands (23), one of which is one bond longer than pyrrolysine (Structure B), and possesses steric similarity to a model of PITC-derivatized lysine (Structure C).

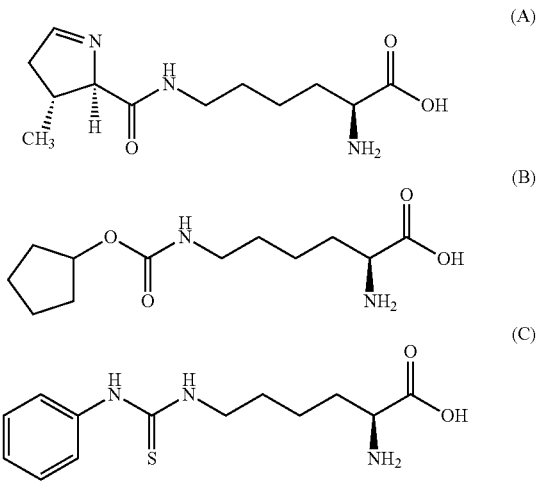

Genomic DNA for the archaea *Methanosarcina mazei*, the source organism for the crystal structure, will be obtained from the American Type Culture Collection (ATCC). The gene will be cloned and expressed. The relevant substrate for assessing compatibility with the DAPES strategy is a peptide with an N-terminal lysine that has been modified with PITC on its side chain, but not its amino terminus. It is expected that the side chain will be derivatized during previous cycles, but that the N-terminus will be regenerated by the cleavage step of the preceding cycle. A peptide with the sequence DKGMMGSSC will be obtained. The peptide will be derivatized with PITC, modifying both the N-terminus and the side chain of the lysine at the second position. The modified aspartate residue will be with the designed enzyme, which has excellent activity against PITC-modified aspartate. The resulting peptide, with an N-terminal lysine modified only on its side chain, will be purified from the reaction mixture by HPLC. The peptide will then be immobilized on the nanogel surface via its C-terminal cysteine. The liberated PylRS domain will be fluorescently labeled with Cy5 and assayed for binding to the immobilized peptide.

In the event that the engineered domain exhibits poor binding, a structural model of the NAAB in complex with pyrrolysine will be constructed using the crystal structure as a template. Computational design will be performed with the program RosettaDesign (24) to optimize the shape complementarity between the protein and the amino acid. We will introduce the suggested mutations into the gene for the NAAB, express and purify the protein, and reassess the binding properties of the new mutant NAAB.

D. NAABs for Phosphorylated Amino Acids

In accordance with various aspects of the present invention, the NAABs may also include reagents capable of specifically binding to phosphorylated N-terminal amino acids (e.g., phosphotyrosine, phosphoserine, and phosphothreonine).

The proteome is elaborated by post-translational modifications. These marks are reversible and provide a snapshot of the current state of a cell with respect to signaling pathways and other regulatory control. Side chain phosphorylation, which primarily occurs on tyrosine, serine, and threonine residues, is a well-known post-translational modification. However, characterization of phosphorylated amino acids by mass spectrometry is difficult. Phosphate groups can be altered or lost during the ionization process, and sample enrichment is typically required to cope with issues of dynamic range (2). Identification of phosphorylated amino acids using digital protocols (e.g., DAPES) is improved because of the improved dynamic range and mild buffer conditions afforded by the present invention. Moreover, the ability to distinguish between phosphorylated and unphosphorylated amino acids could have a huge impact for characterizing cellular and disease states.

NAABs that specifically bind to either phosphoserine, phosphotyrosine, or phosphothreonine can be made by modifying certain tRNA synthetases to include one or more mutations. For example, methanogenic archaea possess an RS for phosphoserine. In contrast to most organisms, methanogenic archaea lack a CysRS. In these organisms, phosphoserine (Sep) is first ligated to the tRNA for cysteine, and then converted to Cys-tRNA in a subsequent step. A crystal structure of SepRS, a class II synthetase in complex with Sep is available from the PDB (pdb code: 2DU3 (36)).

While there are no known phosphotyrosine tRNA synthetases, RSs for several chemically similar analogs have been obtained via directed evolution (37-39). The class I TyrRS from *Methanococcus jannaschii* is the parental protein for these mutants, and a crystal structure is available for engineering (pdb code: 1U7D (apo), 1J1U(holo)). There are several relevant mutant RSs, most notably for sulfotyrosine (37), p-acetyl-L-phenylalanine (pAF), and p-carboxymethyl-L-phenylalanine (pCMF).

Given the stereochemical similarity between phosphate and sulfate, and the fact that phosphatases and phosphoryltransferases often accept sulfates and sulfuryl groups as substrates (40), it has been found that the sulfotyrosine RS will recognize phosphotyrosine without further modification. The pAF RS, for which a crystal structure is available (pdb code: 1ZH6), differs from the sulfotyrosine RS at only two residues (38). Thus, if necessary a template is available for structural modeling and further protein engineering.

There are no reported pThrRSs or previously engineered RSs that recognize pThr analogs. Consequently, generation of a pThrRS may require more extensive protein engineering. We will approach this task from two directions. First, we will use computational design to widen the binding pocket of SepRS to accommodate the additional methyl group present in pThr. Second, we will use the motif-directed design approach to graft previously observed phosphate-binding interactions into the binding pocket of ThrRS. The PDB contains hundreds of examples of binding interactions involving phosphotyrosine (308 examples), phosphoserine (385), and phosphothreonine (325) that are suitable for building a motif library of protein-phosphate interactions. The same design protocol successfully used to switch the specificity of eMAP to eLAP will be applied to transplant these interaction motifs into *E. coli* ThrRS. Mutagenesis of SepRS and ThrRS proteins will be performed using the QuikChange protocol. We will purchase a peptide with the sequence pTGMMGSSC for attachment to the nanogel surface and characterization of binding by single-molecule detection.

It is expected that a NAAB for pThr may also bind to N-terminal pSer. If so, this NAAB can be used for pThr and pSer, and then the specific amino acid can be inferred by evaluating the surrounding sequence to map the peptide onto a reference proteome library. Alternatively, if de novo, phosphorylation-sensitive sequencing is required, then the efficacy of applying a pSer NAAB, detecting binding, then applying a pThr NAAB without an intervening wash step will be assessed. Bound pSer termini will be blocked by the pSer NAAB, and only additional fluorescent spots will be identified as pThr residues.

E. Fluorophores

In accordance with various aspects of the present invention, the NAABs are fluorescently labeled such that when a NAAB binds to an amino acid, fluorescence can be detected. Fluorophores useful for fluorescently labels on the NAABs include, for example, but are not limited to Cy3 and Cy5. The fluorophores are usually coupled on-specifically to free amine groups (e.g., lysine side chains) of the NAABs.

II. Method of Making NAABs by Introducing Mutations into tRNA Synthetase Proteins The present invention also relates to a method for making a NAAB by introducing mutations into the amino acid sequence of a tRNA synthetase (RS) to produce a NAAB that selectively binds to a particular N-terminal amino acid. For example, such methods can involve introducing one or more mutations into a naturally occurring RS (e.g., into a wild-type *E. coli* RS). Such methods can also involve introducing one or more additional mutations into an RS that already includes one or more amino acid mutations in its sequence as compared to the sequence of a corresponding wild-type RS.

The methods for making NAABs comprise identifying the amino acid binding domain of a tRNA synthetase, introducing one or more mutations into the amino acid binding domain to create a NAAB, and assaying the NAAB for specific binding to an N-terminal amino acid of a polypeptide.

Where the tRNA synthetase is a class I tRNA synthetase, identification of the amino acid binding domain can be accomplished, for example, by constructing a sequence alignment that aligns pairwise the amino acid sequences of two or more class I tRNA synthetases with one another, wherein one of the class I tRNA synthetases has a previously defined amino acid binding domain. This allows for identification of corresponding sequence positions between proteins in order to share useful mutations between NAABs. Thus, in certain aspects of these methods, the tRNA synthetase is a first class I tRNA synthetase and the identifying step comprises aligning an amino acid sequence of the first class I tRNA synthetase with an amino acid sequence of a second class I tRNA synthetase having a previously defined amino acid binding domain. For example, the amino acid binding domain of *E. coli* MetRS is known to be encompassed within amino acids 4 to 547 of the protein. Thus, the amino acid sequence of the second class I tRNA synthetase can comprise the amino acid sequence of full-length *E. coli* MetRS (SEQ ID NO: 5) or a fragment thereof which includes the amino acid binding domain. In addition, the amino acid sequence of the second class I tRNA synthetase can comprise a wild-type sequence or can comprise a sequence containing one or more mutations, so long as the presence of the mutations does not significantly impair the ability of the sequence to align with other class I tRNA synthetases. For example, the amino acid sequence of the second class I tRNA synthetase can comprise the amino acid sequence of the engineered MetRS fragment described above (of SEQ ID NO: 4), which contains four amino acid substitutions as compared to the corresponding fragment of wild-type *E. coli* MetRS. The identifying step can comprise aligning the amino acid sequence of full-length *E. coli* MetRS (SEQ ID NO: 5) or a fragment thereof which includes the amino acid binding domain with a class I tRNA synthetase selected from the group consisting of arginine, cysteine, glutamate, glutamine, isoleucine, leucine, lysine, methionine, tyrosine, tryptophan, and valine.

The method can also involve constructing a multiple sequence alignment that aligns the amino acid sequences of the first class I tRNA synthetase, the second class I tRNA synthetase, and at least one additional class I tRNA synthetase. For example, the multiple sequence alignment can align the sequences of at least five, at least seven, or at least nine class I tRNA synthetases. Thus, the multiple sequence alignment can align the amino acid sequence of full-length *E. coli* MetRS (SEQ ID NO: 5) or a fragment thereof which includes the amino acid binding domain with the amino acid sequences of at least two other class I tRNA synthetases selected from the group consisting of arginine, cysteine, glutamate, glutamine, isoleucine, leucine, lysine, methionine, tyrosine, tryptophan, and valine.

Following alignment of an amino acid sequence of a first class I tRNA synthetase with an amino acid sequence of a second class I tRNA synthetase having a previously defined amino acid binding domain, the boundaries of the amino acid binding domain of the first class I tRNA synthetase can be identified using the known boundaries of the amino acid binding domain in the second class I tRNA synthetase as a guide.

Once the amino acid binding domain of a given class I tRNA synthetase has been identified, mutations homologous to the four substitution mutations present in the engineered MetRS fragment described above are introduced into the amino acid binding domain of the class I tRNA synthetase. Thus, for each class I tRNA synthetase, the leucine at position 13 of wild-type *E. coli* MetRS is replaced with a serine (L13S), the phenylalanine at position 260 is replaced with a leucine (Y260L), the aspartic acid at position 296 is replaced with a glycine (D296G), and the histidine at position 301 is replaced with a leucine (H301L).

The binding affinity of each NAAB containing these mutations against a panel of N-terminal amino acids can be predicted in silica using a computer modeling program (e.g., the Rosetta modeling program). Any NAAB with significant predicted cross-binding with undesired target peptides can be subjected to computational redesign for specificity using a multi-state strategy (11). For example, the computational redesign may identify one or more additional mutations likely to improve the binding specificity of the NAAB for a particular N-terminal amino acid. In this approach, structural models of the NAAB in complex with both the desired and undesired amino acids are constructed in silico.

If computational redesign identifies any further mutations as being likely to improve the binding specificity of the NAAB for a particular N-terminal amino acid, such mutations can be introduced into the NAAB.

Similar methods can be used to identify the amino acid binding domains of the class II RSs and introduce mutations into those domains to produce NAABs that selectively bind to N-terminal amino acids that are activated by class II RSs (Ala, Pro, Ser, Thr, His, Asp, Asn, Lys, Gly, and Phe).

The catalytic domain of class II RS proteins contains the amino acid specificity for the enzyme, and these domains can be used as a starting point for developing additional NAABs. Although class II RSs function as multimers, the catalytic domain of the HisRS from *E. coli* can be made monomeric by liberating it from its activation domain (20). The crystal structure of the enzyme in complex with histidyl-adenylate is available (pdb code 1KMM (21)), and can serve as a basis for computational structure-based design. At least one RS crystal structure is available for each of the amino acids activated by class II RSs (Ala, Pro, Ser, Thr, His, Asp, Asn, Lys, Gly, and Phe).

For example, the amino acid binding domains for each of the class II RSs can be identified using the monomeric fragment of *E. coli* HisRS (SEQ ID NO: 9) as a guide to identify corresponding domains in other class II RSs. Structural alignments between the monomeric fragment of *E. coli* HisRS (residues 3-180 and corresponding domains in other class II RSs can be obtained from the Dali web server (22). Multiple sequence alignments for the conserved class II catalytic domain can be obtained from the Pfam database (19). Using these alignments, boundaries for the amino acid binding domains for class II RSs can be identified.

Thus, in some aspects of the method of a making a NAAB, the tRNA synthetase is a first class II tRNA synthetase and the step of identifying the amino acid binding domain comprises aligning an amino acid sequence of the first class II tRNA synthetase with an amino acid sequence of a second class II tRNA synthetase having a previously defined amino acid binding domain. The amino acid sequence of the second class II tRNA synthetase can comprise the amino acid sequence a monomeric fragment of *E. coli* HisRS that contains the amino acid binding domain (e.g., SEQ ID NO: 9). The amino acid sequence of the second class II tRNA synthetase can comprise a wild-type sequence or can comprise a sequence containing one or more mutations, so long as the presence of the mutations does not significantly impair the ability of the sequence to align with other class I tRNA synthetases.

For example, the identifying step can comprise aligning the amino acid sequence of the monomeric fragment of *E. coli* HisRS with a corresponding domain of a class II tRNA synthetase selected from the group consisting of AlaRS, ProRS, SerRS, ThrRS, AspRS, AsnRS, LysRS, GlyRS, and PheRS.

The identifying step can also comprise constructing a multiple sequence alignment that aligns the amino acid sequences of the first class II tRNA synthetase, the second class II tRNA synthetase, and at least one additional class II tRNA synthetase. For example, the multiple sequence alignment can align the sequences of at least five, at least seven, or at least nine class II tRNA synthetases. The multiple sequence alignment can align the amino acid sequence of a monomeric fragment of *E. coli* HisRS that contains the amino acid binding domain with a corresponding domain of at least two other class II tRNA synthetases selected from the group consisting of AlaRS, ProRS, SerRS, ThrRS, AspRS, AsnRS, LysRS, GlyRS, and PheRS. Alternatively, the multiple sequence alignment can align the amino acid sequence of a monomeric fragment of *E. coli* HisRS that contains the amino acid binding domain with corresponding domains of AlaRS, ProRS, SerRS, ThrRS, AspRS, AsnRS, LysRS, GlyRS, and PheRS.

Once the amino acid binding domain of a given class II tRNA synthetase has been identified, mutations (e.g., substitution mutations) are introduced into the amino acid binding domain in order to increase the binding affinity of the domain for a particular N-terminal amino acid.

As with the methods involving class I tRNA synthetases, the methods involving class II tRNA synthetases can also further comprise using a computer modeling program to predict the binding affinity of the NAAB against a panel of N-terminal amino acids. In addition, the NAAB can be subjected to computational redesign to identify one or more additional mutations to improve the binding specificity of the NAAB for a particular N-terminal amino acid. Any additional mutations identified using computational redesign can then be introduced into the NAAB.

The NAABs designed and made using any of the above methods can cloned into an expression vector, expressed in a host cell (e.g., in an *E. coli* host cell), purified, and assayed for specific binding to an N-terminal amino acid of a polypeptide. For example, the binding activity for each NAAB can be assayed against a standard set of polypeptides having different N-terminal residues (e.g., custom synthesized peptides of the form XGMMGSSC, where X is a variable position occupied by each of the twenty amino acids).

For NAABs derived from class II tRNA synthetases, if any of the *E. coli* protein fragments prove to are insoluble or perform poorly as NAABs, protein design can be used to redesign hydrophobic residues that become exposed upon monomerization. If a crystal structure is unavailable for the *E. coli* protein, a synthetic gene for an RS with an experimentally determined structure can be obtained. The availability of structures for these proteins allows application of protein surface redesign if the domain truncation results in loss of solubility, binding pocket redesign for enhanced affinity if binding is weak, or multi-state design for enhanced specificity if promiscuous binding is observed (11).

In any of the above methods, the tRNA synthetase amino acid sequences can be *E. coli* tRNA synthetase amino acid sequences.

In addition, in any of the above methods, the sequences can be aligned pairwise by various methods known in the art, for example, using the hidden Markov models available in the Pfam database (19), dynamic programming, and heuristic methods like BLAST.

Also, in any of the above methods, mutations that favor desired binding and disfavor undesired binding can be introduced into any of the wild-type proteins described above by various methods, for example, using mutagenic primers to introduce mutations via site-directed mutagenesis, PCR-based mutagenesis and Kunkel mutagenesis. Various computer programs can be used to design suitable primers (e.g., the QUICKCHANGE (Aligent Technologies) primer design program).

III. Polypeptide Sequencing Using NAABs

In accordance with various aspects of the present invention, the NAABs discussed above are used as reagents in a method of polypeptide sequencing. Generally, the method of sequencing a polypeptide comprises the steps of:
(a) contacting the polypeptide with one or more fluorescently labeled N-terminal amino acid binding proteins (NAABs);
(b) detecting fluorescence of a NAAB bound to an N-terminal amino acid of the polypeptide;
(c) identifying the N-terminal amino acid of the polypeptide based on the fluorescence detected;
(d) removing the NAAB from the polypeptide;
(e) optionally repeating steps (a) through (d);
(f) cleaving the N-terminal amino acid of the polypeptide via Edman degradation; and
(g) repeating steps (a) through (f) one or more times.

In step (a), the polypeptide is contacted with one or more NAABs. In various aspects, the polypeptide is contacted with a single type of NAAB that selectively binds to a single type of N-terminal amino acid residue (e.g., a NAAB that selectively binds to N-terminal alanine residues or a NAAB that selectively binds to N-terminal methionine residues). In other embodiments, the polypeptide is contacted with a mixture of two or more types of NAABs that each selectively binds to different amino acid residues. For example, the mixture may comprise two NAABs such as a NAAB that selectively binds to N-terminal alanine residues and a NAAB that selectively binds to N-terminal cysteine residues. A mixture comprising two or more NAABs that selectively bind to different amino acid residues is especially useful when sequencing several polypeptides simultaneously. Introducing multiple different NAABs also reduces sequencing time because multiple N-terminal amino acid residues can be identified during a single iteration of steps (a) through (d). As such, in various embodiments, the method comprises sequencing a plurality of polypeptides. These embodiments are especially suited for high throughput sequencing methods.

In various aspects of the invention, the polypeptide may be immobilized on a substrate prior to contact with the one or more NAABs. The peptide may be immobilized on any suitable substrate. For example, nanogel substrates have been developed with low non-specific adsorption of proteins and the ability to visualize single attached molecules on this surface (8, 9). Moreover, a plurality of polypeptides may be immobilized on the substrate for sequencing. Immobilizing a plurality of polypeptides is especially suited for high throughput sequencing methods.

The NAABs of the present inventions are fluorescently labeled with a fluorophore such that when a NAAB binds to a N-terminal amino acid, fluorescence emitted by the fluorophore can be detected by an appropriate detector. Suitable fluorophores include, but are not limited to Cy3 and Cy5. Fluorescence can suitably be detected by detectors known in the art. Based on the fluorescence detected, the N-terminal amino acid of the polypeptide can identified.

In aspects of the method where the contacting step comprises contacting the polypeptide with a mixture of two or more types of NAABs that each selectively binds to different amino acid residues, each type of NAAB is suitably labeled with different fluorophores having different fluorescence emission spectra. For example, the contacting step can comprise contacting the polypeptide with a first type of NAAB and a second type of NAAB, wherein the first type of NAAB selectively binds to a first type of N-terminal amino acid residue and the second type of NAAB selectively binds to a second type of N-terminal amino acid residue different from the first type of N-terminal amino acid residue. In such methods, the first type of NAAB is suitably coupled to a first fluorophore and the second type of NAAB is suitably coupled to a second fluorophore, wherein the first and second fluorophores have different fluorescence emission spectra.

In step (d), the one or more NAABs are removed from the polypeptide(s). Removing the one or more NAABs includes removing any excess NAABs present in solution and/or removing any NAABs that are bound to N-terminal amino acids of the polypeptides. Removal of the NAABs is suitably accomplished by washing the polypeptide with a suitable wash buffer in order to cause dissociation of any bound NAABs. In embodiments where the polypeptide is immobilized on a solid substrate, the reagent may be removed by contacting the substrate with a suitable wash buffer.

Steps (a)-(d) may be repeated any number of times until the N-terminal amino acid of the polypeptide has been identified. In embodiments where a plurality of polypeptides is being sequenced, steps (a)-(d) may be repeated any number of times until all of the N-terminal amino acids of the polypeptide(s) have been identified. During each repetition, a different NAAB or a set of NAABs may be used in step (a) to probe the N-terminal amino acid of the polypeptide(s). Thus, for example, where step (a) comprises contacting the polypeptide with a single type of NAAB that selectively binds to a single type of N-terminal amino acid residue, it may be necessary to repeat steps (a) through (d) up to 24 or more times in order to probe the polypeptide with a NAAB specific for each of the twenty standard amino acids, for PITC-derivatized lysine, and for each of the three common phosphorylated amino acids. Alternatively, where step (a) comprises contacting the polypeptide with two or more different types of NAABs simultaneously, fewer repetitions of steps (a) through (d) will be necessary to identify the N-terminal amino acid of the polypeptide.

After the N-terminal amino acid has been identified or after all of the N-terminal amino acids have been identified (when sequencing multiple polypeptides simultaneously), the N-terminal amino acid(s) may be cleaved from the polypepitde(s) via Edman degradation. Generally, the Edman degradation comprises reacting the N-terminal amino acid of the polypeptide with phenyl isothiocyanate (PITC) to form a PITC-derivatized N-terminal amino acid, and cleaving the PITC-derivatized N-terminal amino acid. In various aspects of the invention, the modified N-terminal amino acid may be cleaved using an Edman degradation enzyme as described in further detail below. In other embodiments, the modified N-terminal amino group may be cleaved by methods known in the art including contact with acid or exposure to high temperature. In these aspects, any substrate comprising the immobilized polypeptide(s) should be compatible with the acidic conditions or high temperatures.

FIG. 1 provides a diagrammatic representation of the steps of a method of polypeptide sequencing according to the present invention. In step 1 of FIG. 1, multiple polypeptide molecules are immobilized on a substrate. The individual peptide molecules are suitably spatially segregated on the substrate. Analyte proteins may be fragmented into two or more polypeptides prior to immobilization on the substrate.

In step 2 of FIG. 1, the immobilized polypeptides are contacted with a fluorescently labeled NAAB and fluorescence of the NAAB bound to the N-terminal amino acid of any of the peptides is detected. An image of the substrate is suitably captured at this stage. Subsequently, the NAAB is washed off the substrate. This cycle of binding, detection, and removal of the NAAB is repeated until the N-terminal amino acids of all of the immobilized polypeptides have been identified (step 3). Next, in step 4, the N-termini of the polypeptides are reacted with phenyl isothiocyanate (PITC) (black ovals in FIG. 1). In step 5, an Edman degradation ("Edmanase"), catalyzes the removal of the PITC-derivatized N-terminal amino acid under mild conditions. In each complete cycle, one amino acid is sequenced from each peptide and a new N-terminus is generated for identification in subsequent cycles (step 6).

In the polypeptide sequencing methods described herein, some of the NAABs may bind smaller, sterically similar off-target amino acids. For example, the isoleucine-specific NAAB derived from IleRS and the threonine-specific NAAB derived from ThrRS may bind N-terminal valine and serine residues, respectively, in addition to their desired targets. However, this does not hinder the effectiveness of this protein sequencing technique. Although various aspects of the present invention relate to a reagent comprising NAABs for all twenty amino acids, the optimal set size for actual sequencing may be less than twenty. Reducing the number of NAABs involves trading off absolute specificity for fewer binding molecules by using a reduced alphabet for protein sequences. It may be more efficient to identify multiple amino acids (such as isoleucine and valine) with a single NAAB, and treat these amino acids as interchangeable when matching against a sequence database. It is also possible to enforce specificity in digital protocols such as DAPES by introducing the NAABs in a step-wise fashion. For example, the valine-specific NAAB derived from ValRS can be added before the isoleucine-specific NAAB derived from IleRS, with the intention of identifying and capping N-terminal valine residues before molecules intended to target isoleucine residues that can bind to them.

Methods of the present invention possess attractive features relative to mass spectrometry. Because detection operates at the single molecule level, this method will have excellent dynamic range, and will be appropriate for extremely small amounts of sample. Furthermore, the digital nature of the detection produces inherently quantitative data. Finally, because all steps can be carried out in neutral aqueous buffer, post-translation modifications (e.g., phosphorylations) remain stable and available for analysis.

IV. Enzymatic Edman Degradation

In another aspect, the present invention is directed to a method and reagents for enzymatic Edman degradation (i.e., cleaving the N-terminal amino acid of a polypeptide). In accordance with this aspect, one or more enzymes are provided that catalyze the cleavage step of the Edman degradation in aqueous buffer and at neutral pH, thereby providing an alternative to the harsh chemical conditions typically employed in conventional Edman degradation. In one aspect, the Edman degradation enzyme a modified cruzain enzyme. Cruzian is a cysteine protease in the protozoa *Trypanosoma cruzi* and was discovered to possess many of the desired characteristics for creating an Edman degradation enzyme.

In conventional Edman degradation, polypeptides are sequenced by degradation from their N-terminus using the Edman reagent, phenyl isothiocyanate (PITC). The process requires two steps: coupling and cleavage. In the first step (coupling), the N-terminal amino group of a peptide reacts with phenyl isothiocyanate to form a thiourea. In the second step, treatment of the thiourea with anhydrous acid (e.g., trifluoroacetic acid) results in cleavage of the peptide bond between the first and second amino acids. The N-terminal amino acid is released as a thiazolinone derivative. The thiazoline derivative may be extracted into an organic solvent, dried, and converted to the more stable phenylthiohydantoin (PTH) derivative for analysis. The most convenient method for identifying the PTH-amino acids generated during each sequencing cycle is by UV absorbance and HPLC chromatography. Each amino acid is detected by it UV absorbance at 269 nm and is identified by its characteristic retention time.

In digital protocols, such as DAPES, the N-terminal amino acid has already been identified. Therefore, there is no need to generate or detect a phenylthiohydantoin derivative of the terminal amino acid. However, the strongly acidic conditions typically used in the cleavage step of conventional Edman degradation protocols are incompatible with the substrate surface upon which the polypeptides are immobilized for single molecule protein detection (SMD) (e.g., a nanogel surface). One modification of the conventional Edman degradation dispenses with the acidic conditions promotes cleavage with elevated temperature (e.g., 70-75° C.) instead (25). However, some substrate surfaces used to immobilize peptides include bovine serum albumin (BSA), which has a melting temperature of approximately 60° C. in the absence of stabilizing additives (26). Further, repeated cycles of heating and cooling of the substrate surface (e.g., nanogel) may be undesirable. Thus, the present invention provides a method of performing the Edman degradation which dispenses with both acidic conditions and elevated temperature. Advantageously, an enzyme has been developed which accomplishes the cleavage step in a neutral, aqueous buffer. This enzyme avoids acidic conditions and high temperatures and decreases the cycle time for polypeptide sequencing by reducing or eliminating the need to change buffer and temperature conditions repeatedly.

The Edman degradation enzyme (or "Edmanase") according to the present invention accomplishes the chemical step of the N-terminal degradation by nucleophilic attack of the thiourea sulfur atom on the carbonyl group of the scissile peptide bond. As noted, the enzyme was made by modifying cruzain, a cysteine protease from the protozoa *Trypanosoma cruzi* (SEQ ID NO: 30). Cruzain prefers hydrophobic amino acids at the S2 position relative to the scissile bond, which corresponds to the phenyl moiety of the Edman reagent. The protease is relatively insensitive to the identity of the amino acid at the S1 position (29), allowing for promiscuous cleavage of diverse N-terminal residues. Furthermore, this protein has been the subject of extensive structural characterization (27).

Figure 4A:
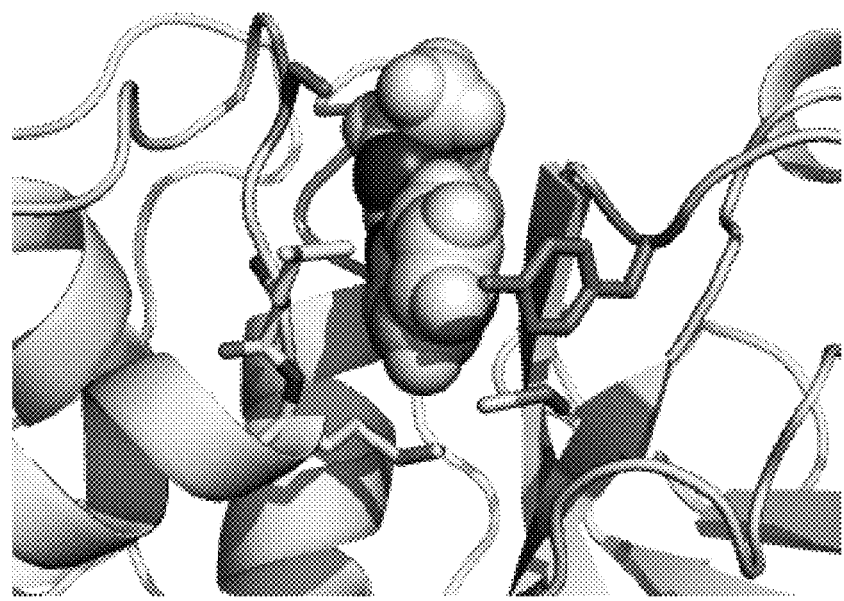
FIG. 4A-4B depict three mutations (indicated by the arrows) introduced into a model of cruzain (pdb code: 1U9Q (27)) to accommodate the phenyl moiety of the Edman reagent phenyl isothiocyanate.
Figure 4B:
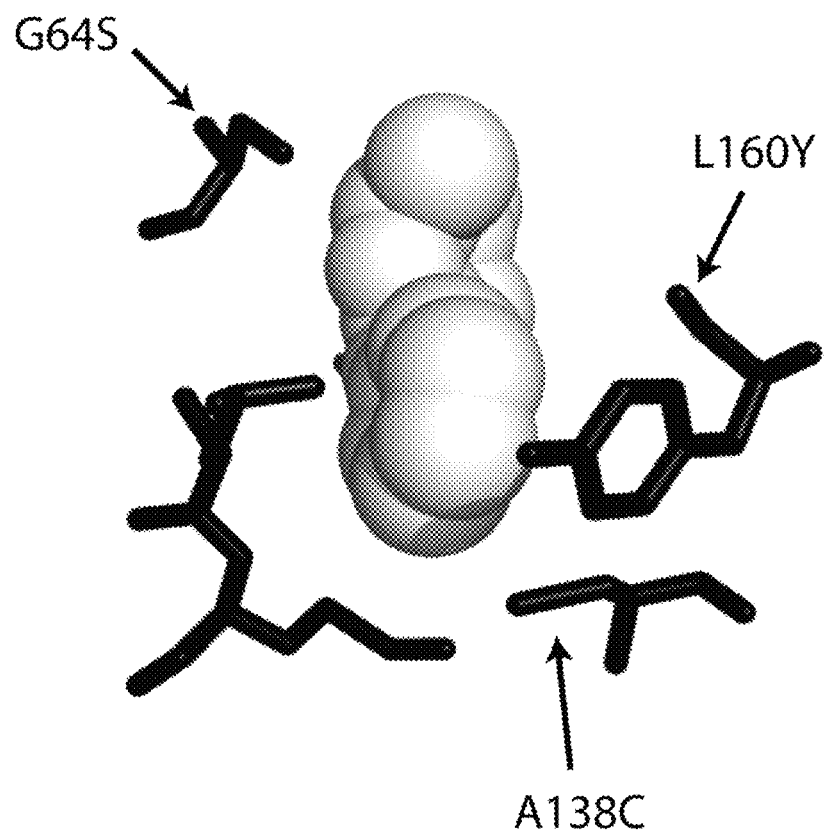
Figure 5A:
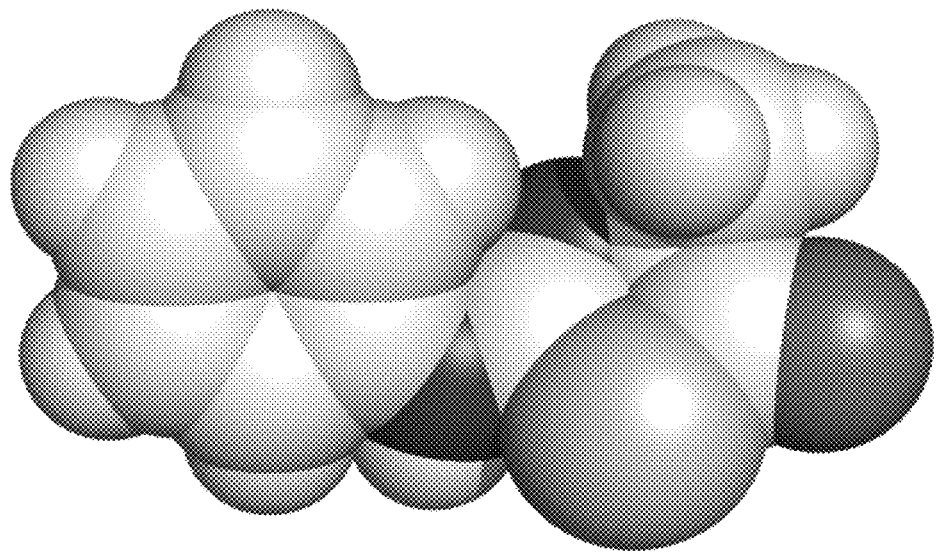
FIG. 5A depicts a model for a cleavage intermediate for Edman degradation generated using experimental small molecules structures for similar compounds and geometrically optimized using quantum chemistry calculations.
Figure 5B:
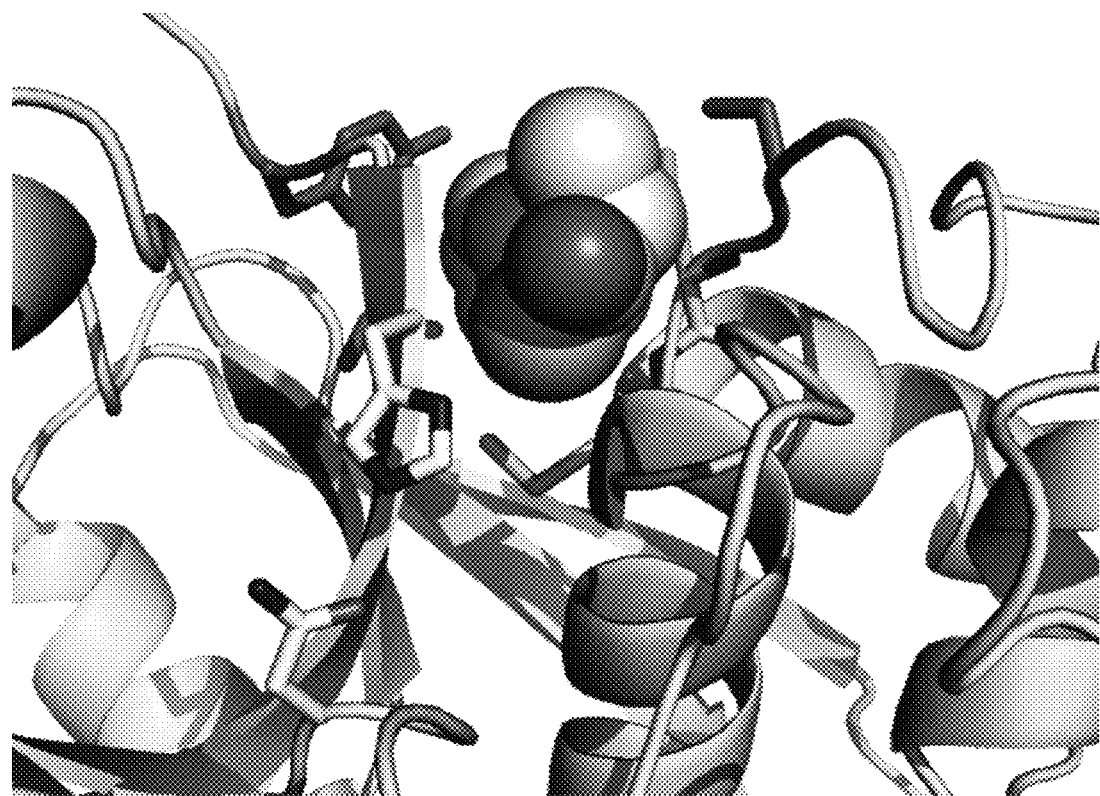
FIG. 5B shows the model for the intermediate fitted into the active site cleft of the enzyme cruzain. The wild-type catalytic cysteine was removed. The activating residues (the other two components of the 'catalytic triad') were retained. These are a histidine and asparagine that are intended to activate the sulfur atom in the Edman reagent for nucleophile attack on the peptide bond.

The Edman degradation enzyme differs from the wild-type of cysteine protease cruzain at four positions. One mutation (C25G) removes the catalytic cysteine residue while three mutations (G65S, A138C, L160Y) were selected to create steric fit with the phenyl moiety of the Edman reagent (PITC). FIG. 4A-4B depicts latter three mutations (indicated by the arrows) introduced into a model of cruzain (pdb code: 1U9Q (27); SEQ ID NO: 30) to accommodate the phenyl moiety of the Edman reagent phenyl isothiocyanate. FIG. 4A depicts a model for the cleavage intermediate of an N-terminal alanine residue in the active site cleft. In addition to the engineered residues, two wild-type residues (shown in green sticks) contribute to forming a complementary pocket. FIG. 4B depicts a space-filling representation of the packing of the phenyl ring by protein side chains. The methyl group of the ligand (in gray at the top of the panel) corresponds to the side chain of the N-terminal residue to be cleaved, and is not involved in the tight packing between enzyme and substrate. The enzyme was expressed and purified.

Accordingly, one aspect of the present invention relates to an isolated, synthetic, or recombinant Edman degradation enzyme comprising an amino acid sequence having a glycine residue at a position corresponding to position 25 of wild-type *Trypanosoma cruzi* cruzian; a serine residue at a position corresponding to position 65; a cysteine residue at a position corresponding to position 138; and a tryptophan residue at a position corresponding to position 160.

The remaining amino acid sequence of the Edman degradation enzyme comprises a sequence similar to that of wild-type *Trypanosoma cruzi* cruzian, but may contain additional amino acid mutations (including deletions, insertions, and/or substitutions, so long as such mutations do not significantly impair the ability of the Edman degradation enzyme to cleave PITC-derivatized N-terminal amino acids. For example, the remaining amino acid sequence can have at least about 80%, or at least 85%, at least 90%, at least 93%, at least 95%, at least 96%, at least 87%, at least 98%, or at least 99% sequence identity with the sequence of the wild-type *Trypanosoma cruzi* cruzian.

In some aspects of the invention, the Edman degradation enzyme comprises the sequence of SEQ ID NO: 29. For example, the Edman degradation enzyme can consist of the sequence of SEQ ID NO: 29.

In various aspects of the invention, the reagents for enzymatic Edman degradation comprise two or more enzymes. For example, one point of concern is the ability to cleave proline residues. If a single mutant of cruzain cannot accomplish this reaction, then an additional enzyme would be required. Naturally occurring enzymes cleave dipeptides of the form Xaa-Pro from the N-terminus of peptides, for example, quiescent cell proline dipeptidase (QPP) (35), and Xaa-Pro amino peptidase (pdb code: 3OVK). PITC-coupled N-terminal proline is chemically and sterically very similar to a dipeptide. Therefore, these enzymes are excellent starting points for engineering a proline-specific activity.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products, compositions and processes without departing from the scope of the invention, it is intended that all matter contained in the above description and shown in the accompanying drawings shall be interpreted as illustrative and not in a limiting sense.

EXAMPLES

The following non-limiting examples are provided to further illustrate the present invention.

Example 1. eLAP: A NAAB that Specifically Binds to N-Terminal Leucine Residues

In this example, an *E. coli* methionine aminopeptidase (eMAP) was modified to create a NAAB that binds specifically to N-terminal leucine residues. Two mutually compatible leucine-contacting interactions were identified from the protein data bank (PDB) (15) that could be incorporated into the eMAP structure. The surrounding protein residues of eMAP were redesigned around these two interactions. The resulting NAAB for leucine (eLAP) has 19 amino acid mutations relative to eMAP.

Figure 2A:
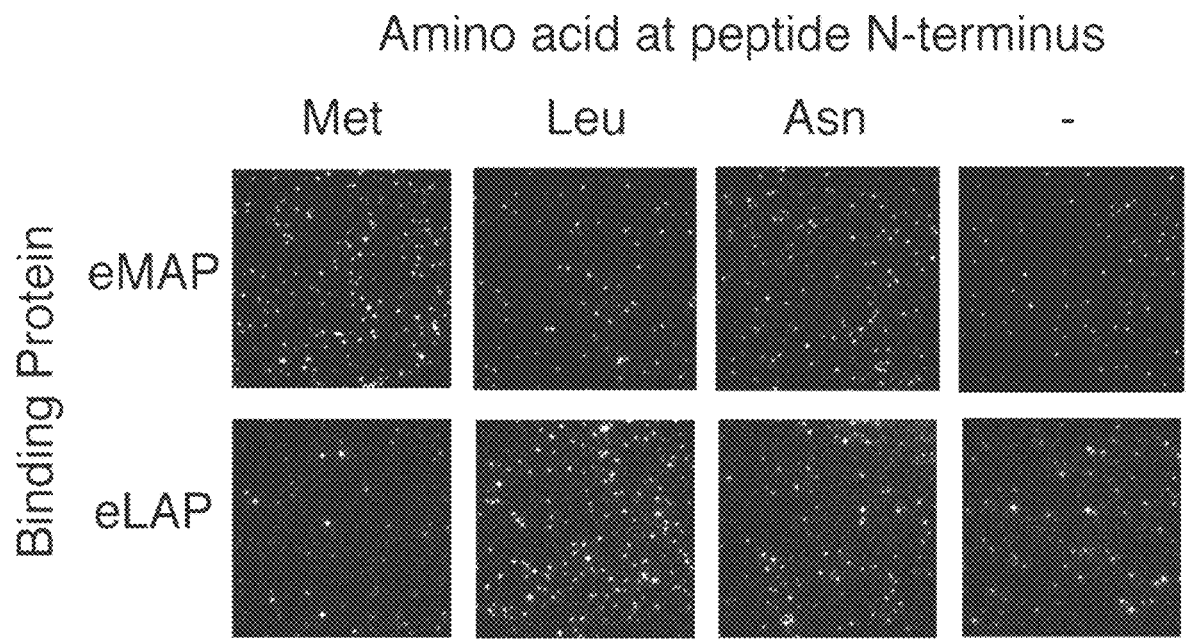
FIGS. 2A-2B show the binding specificity of wild-type E. coli methionine aminopeptidase (eMAP) and an engineered leucine-specific aminopeptidase (eLAP) of the present invention in a single-molecule detection experiment.
Figure 2B:
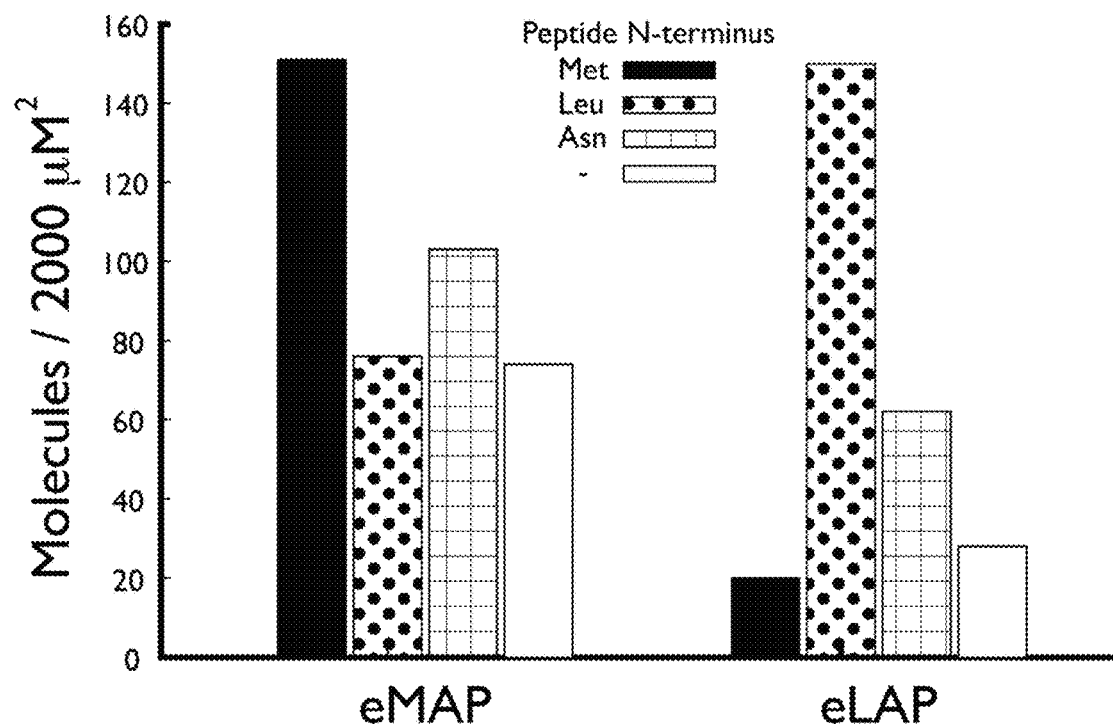

The eMAP and eLAP proteins were expressed and assayed for binding against a panel of peptides with different N-termini. The NAAB for N-terminal leucine amino acids was non-specifically labeled with Cy5 fluorophore on lysine side chains. Synthetic peptides with either N-terminal methionine, leucine, or asparagine amino acids were coupled to a nanogel surface by thiol linkage. An additional experiment was performed with no peptide added. The labeled NAAB was briefly incubated with the immobilized peptide, and unbound protein was removed by washing. Bound protein, which may be bound specifically to peptides or non-specifically to the surface, was imaged by total internal reflection fluorescence (TTRF) microscopy. Spots exceeding a detection threshold were deemed to indicate bound protein and were converted to a number of counts per field-of-view. FIGS. 2A-2B show the binding specificity of wild-type E. coli methionine aminopeptidase (eMAP) and eLAP in a single-molecule detection experiment. In FIG. 2A, fluorescently labeled eMAP and eLAP NAABs were visualized after binding to immobilized peptides with different N-terminal amino acids. FIG. 2B depicts histograms of quantitative binding. Digital analysis of NAAB binding for eMAP and eLAP showed that each NAAB was specific for the expected N-terminal amino acid. Both proteins exhibited roughly a 2:1 ratio of specific to non-specific binding.

These results demonstrate that individual N-terminal amino acids can be identified in an SMD format using NAABs that are selective for a particular amino acid.

Example 2. A NAAB that Specifically Binds to N-Terminal Methionine Residues

In this example, a truncated version of wild-type E. coli methionyl-tRNA synthetase (MetRS) from E. coli. was modified to make a NAAB that binds specifically to N-terminal methionine residues. A truncated version of MetRS (residues 1-547) having three amino acid mutations (L13S, Y260L, and H301L) that had been shown to pre-organize the binding site towards the methionine-bound conformation was obtained (16). A crystal structure is available of this mutant bound to free methionine (pdb code: 3h99). An additional mutation (D296G) was introduced to provide a more open binding pocket capable of accommodating a peptide and avoid steric clashes. This mutation was introduced into MetRS and the altered protein was expressed in E. coli. The gene encoding MetRS from genomic DNA was amplified and was cloned into the pET42a expression vector between the MfeI and XhoI sites. This yielded a genetic fusion of a thrombin-cleavable GST tag and MetRS. The mutations were introduced using the QuikChange protocol. The proteins were expressed at 16° C. overnight using the autoinduction protocol of Studier (17). The GST-MetRS fusion was purified from lysates by affinity chromatography using GSTrap columns on a Bio-Rad liquid chromatography system. Following purification, proteins were labeled with Cy5 fluorophore on lysine side chains for single-molecule binding assays.

Figure 3:
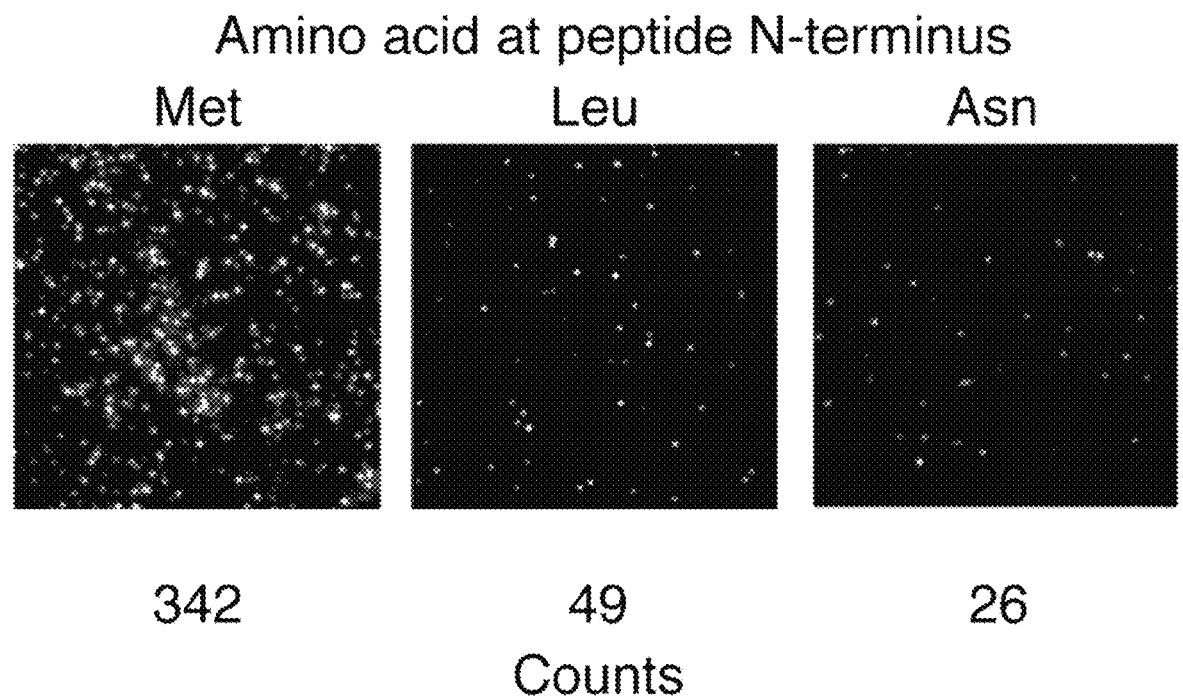
FIG. 3 shows the binding specificity of an engineered mutant of methionine tRNA synthetase (MetRS) of the present invention that exhibits binding specificity for surface-immobilized peptides with N-terminal methionines.

Using an SMD assay we then tested the specificity of our mutant MetRS for peptides with different amino acids at the N-terminus. Peptides of the form XGMMGSSC were purchased commercially, where X is methionine, leucine, or asparagine. The peptides were immobilized on a nanogel surface via thiol linkages, and the engineered MetRS domain was applied to the surface. Single molecule detection of bound MetRS was imaged by total internal reflection fluorescence (TTRF) microscopy. The resulting images are shown in FIG. 3. Quantitation of single-molecule binding events yields specific to non-specific binding of ~7:1 and ~13:1 for the alternate amino acids. The data in FIG. 3 show that the domain exhibits specific binding for N-terminal methionine, indicating that engineered RS fragments are excellent molecular reagents for DAPES and that computational protein design is an efficient method for producing NAABs with specificity for particular N-terminal amino acids.

Example 3. A NAAB that Specifically Binds to N-Terminal Histidine Residues

In this example, a histidine-tRNA synthetase (HISRS) from E. coli was modified to create a NAAB that binds specifically to N-terminal histidine residues. The fragment of wild-type HisRS from 1-320 was shown to be monomeric by others. After inspecting the crystal structure of HisRS, further residues were truncated from both ends. The initial fragment tested has from Lysine3 to Alanine180. Protein design was conducted to replace a long loop near the binding site with a shorter loop that would create a more open pocket and result in tighter binding to N-terminal histidine residues. This involved the replacement of an 11 residue loop (from Arginine113 to Lysine123) with a 4 residue turn, wherein the four residues of the inserted turn are Glycine, Asparagine, Alanine, and Proline. Thus, this NAAB comprises an internally truncated version of wild-type E. coli HisRS (residues 3-180; SEQ ID NO: 10) having seven fewer residues as compared to the wild-type sequence. The sequence of this N-terminal histidine-specific NAAB is provided by SEQ ID NO: 9.

Figure 7:
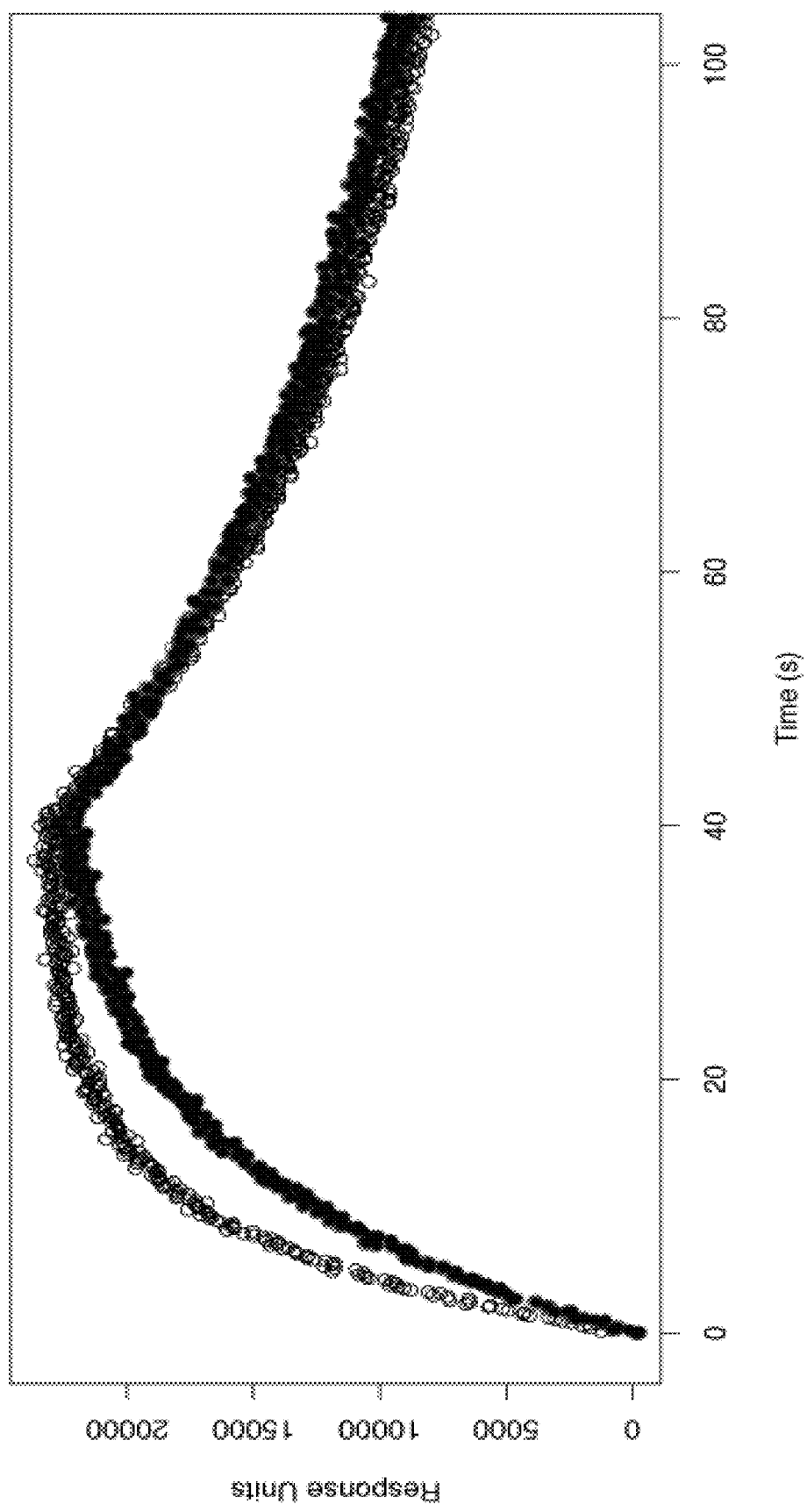
FIG. 7 is a trace plot of biolayer interferometry kinetics data showing the binding affinity of two proteins for peptides with N-terminal histidine residues: (1) engineered His NAAB (open circles); (2) native wild-type protein (solid circles).

FIG. 7 shows that engineered HisNAAB (SEQ ID NO: 10) exhibits enhanced binding affinity for peptides with N-terminal histidine residues as compared to the wild-type fragment. Biolayer interferometry kinetics data show that the engineered HisNAAB (data in open circles) binds N-terminal histidine with the same off-rate as the wild-type fragment (SEQ ID NO: 90 (data in solid circles), but with an enhanced on-rate. As a result, the engineered His NAAB binds with an approximately 10-fold improvement in binding affinity.

Example 4. Purification of an Edman Degradation Enzyme

A synthetic gene containing the Edman degradation enzyme was purchased from GenScript. The gene encoded a modified version of the cruzian enzyme of T. cruzi having the following substitution mutations: C25G, G65S, A138C, and L160Y.

The gene was inserted between an NdeI andan XhoI site in a pet42(a) (Novagen) expression vector and transformed into E. coli, BL-21(De3) chemically competent cells. Protein was then over-expressed following Studier's auto-induction protocol. Bacterial cells were harvested by centrifugation of the cell culture at 5000 rpm and 4° C. for 10 minutes. Cells were then suspended in 1×PBS with 10% glycerol and 6M guanidine chloride, pH 7.4. Cells were then lysed by sonication (15 seconds at 20% power, 8 times on ice). The cell lysate was centrifuged at 18000 rpm, 4 degrees for 20 minutes. The supernatant was then filtered through a 0.2 μm cellulose acetate filter. The filtered lysate was loaded onto a 5 mL HisTrap (Ni-NTA) column and washed with 5 column volumes of binding buffer (50 mM Tris-HCl, 150 mM NaCl, 6M guanidine chloride, 25 mM imidazole). Bound protein was then eluted in 50 mM Tris-HCl, 150 mM NaCl, 6M guanidine chloride, 500 mM imidazole. Purified fractions were prepared for SDS-PAGE analysis by mixing 2 parts sample with 1 part 4× loading dye. Samples were analyzed on 16% SDS-PAGE precast gels, and visualized by Coomassie staining. The purified protein was then refolded by successive, overnight dialyses into 1×PBS containing 5M, 3M, 1M, 0.5M, and 0M guanidine chloride. Protein concentration was determined using the calculated molar extinction coefficient and measuring the A280 on an ND-8000 spectrophotometer (Thermo Fisher Scientific).

Example 5. Substrates and Inhibitors for Edman Degradation Enzyme (Edmanase)

Single amino acid, aminomethylcoumarin (AMC) containing compounds were obtained from BAChem (Bubendorf, Switzerland). These included Arg-AMC, Asn-AMC, Phe-AMC, Met-AMC, Ala-AMC, and Pro-AMC. Phenylisothiocyanate (PITC) was purchased from Thermo-scientific and coupled to the N-terminus of each substrate by incubating for 10 minutes at room temperature in a 100 µL solution of acetonitrile:pyridine:water (10:5:3) with 5 µL of PITC. The derivatized substrate was then dried by rotary evaporation and suspended in 250 µL of 1× Phosphate Buffered Saline (PBS). Inhibitor compound, 1-(2-anilino-5-methyl-1,3-thiazol-4-yl)-ethanone, was ordered from Sigma-Aldrich (St. Louis, MO).

Example 6. Edmanase Activity Measurements

Figure 6:
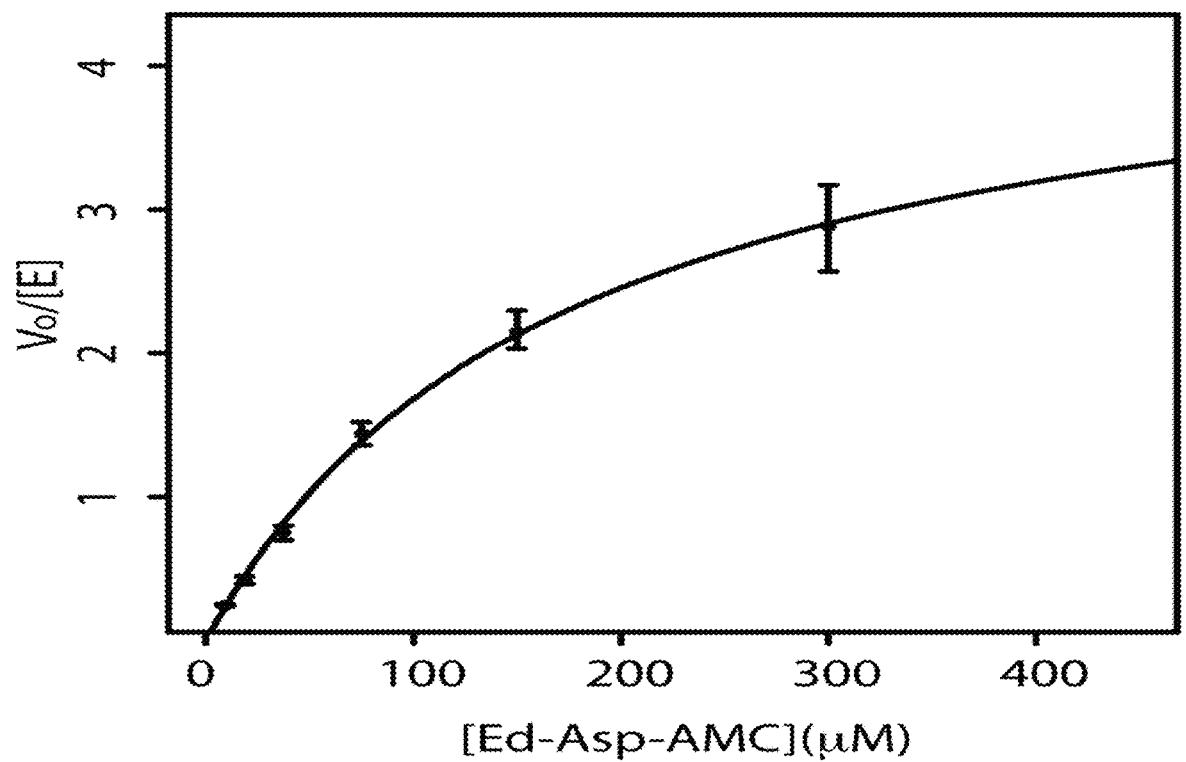
FIG. 6 is a graphical representation of kinetic data from cleavage experiments using an Edman degradation enzyme of the present invention and the substrate Ed-Asp-AMC.

The ability of the Edman degradation enzyme to perform N-terminal cleavage on six substrates of the form Ed-X-AMC, where Ed denotes the Edman reagent, X is an amino acid from the set (Ala, Asp, Phe, Met, Pro, Arg), and AMC is the fluorogenic amidomethylcoumarin group was characterized. Cleavage of the X-AMC bond was monitored by the appearance of fluorescence (FIG. 6). The engineered protein displayed activity against all six substrates to varying degrees (See Table below).

All kinetic measurements were performed in a 96-well corning plate on a BioTek Synergy2 plate reader at 30 degrees. Reactions were started by adding 5-20 µL of purified enzyme to 100 µL of 10 mM substrate solution. Final enzyme concentration was between 1 nM and 100 nM, depending on the experiment. Fluorescence of the cleaved product was measured by exciting at 370 nm (30 second intervals for 1-10 hours) and monitoring emissions at 460 nm. A standard curve using AMC from Invitrogen was referenced quantitate the amount of product formation.

TABLE

Measured kinetic rates for Edmanase

| Substrate (X-AMC) | $K_{cat}$ (s$^{-1}$) | $K_m$ (µM) | $K_{cat}/K_M$ |
|---|---|---|---|
| Alanine | 0.55 | 21.3 | $2.6 \times 10^4$ |
| Arginine | 0.087 | 167.8 | $5.2 \times 10^2$ |
| Asparagine | 3.6 | 124.5 | $2.9 \times 10^4$ |
| Methionine | 0.54 | 271.8 | $2.0 \times 10^3$ |
| Phenylalanine | 0.47 | 122.8 | $3.8 \times 10^3$ |
| Proline | 0.0014 | 252.0 | $5.7 \times 10^1$ |

Example 7. Inhibition of the Edman Degradation Enzyme by 1-(2-anilino-5-methyl-1,3-thiazol-4-yl)-ethanone Assays were conducted as described above in Example 5, with 5 µM substrate, 100 nM enzyme, and 500 nM-15 µM 1-(2-anilino-5-methyl-1,3-thiazol-4-yl)-ethanone. Reaction velocity was determined as above, plotted against the inverse of inhibitor concentration, and fit by non-linear least squares to determine the inhibition constant.

Example 8. Cloning of Additional N-Terminal Amino Acid Binding Proteins (NAABs)

Primers specific for each NAAB were ordered from Integrated DNA Technologies. Each NAAB was then amplified from isolated, *E. coli* genomic DNA and transferred to a pet42a expression vector at various positions, depending on the gene sequence. These constructs were transformed into either *E. coli* BL21(DE3) or *E. coli* 'Arctic Express' competent cells for expression.

Example 9. Expression and Purification of N-Terminal Amino Acid Binders (NAABs)

Protein was over-expressed following Studier's auto-induction protocol. Bacterial cells were harvested by centrifugation of the cell culture at 5000 rpm and 4° C. for 10 minutes. Cells were then suspended in 1×PBS with 10% glycerol, pH 7.4. Cells were then lysed by sonication (15 seconds at 20% power, 8 times on ice). The cell lysate was centrifuged at 18000 rpm, 4 degrees for 20 minutes. The supernatant was then filtered through a 0.2 um cellulose acetate filter. The filtered lysate was loaded onto a 1 mL GSTrap column and washed with 5 column volumes of binding buffer (1×PBS). Bound protein was then eluted in 50 mM Tris-HCl, 10 mM reduced glutathione. Purified fractions were prepared for SDS-PAGE analysis by mixing 2 parts sample with 1 part 4× loading dye. Samples were analyzed on 16% SDS-PAGE precast gels, and visualized by Coomassie staining. Protein concentration was determined using the calculated molar extinction coefficient and measuring the A280 on an ND-8000 spectrophotometer (Thermo Fisher Scientific).

Example 10. Binding Assays

Real time binding assays between peptides and purified NAABs were performed using biolayer interferometry on a Blitz system (Fortebio, Menlo Park, CA). This system monitors interference of light reflected from the surface of a fiber optic sensor to measure the thickness of molecules bound to the sensor surface. Sensors coated with peptides were allowed to bind to the NAABs in 1×PBS at several different protein concentrations. Binding kinetics were calculated using the Blitz software package, which fit the observed binding curves to a 1:1 binding model to calculate the association rate constants. NAABs were allowed to dissociate by incubation of the sensors in 1×PBS. Dissociation curves were fit to a 1:1 model to calculate the dissociation rate constants. Binding affinities were calculated as the kinetic dissociation rate constant divided by the kinetic association rate constant.

TABLE

Measured Affinity Constants

| | |
|---|---|
| Glutamate | 2.12 μM |
| Phenylalanine | 3.44 μM |
| Histidine | 98.7 μM |
| Methionine | 1.07 μM |
| Asparagine | 754 nM |
| Arginine | 129 nM |
| Tryptophan | 48.9 nM |
| Tyrosine | 57.6 μM |
| Phosphoserine | 7.72 μM |
| Phosphotyrosine | 1.07 μM |
| Aspartate | 411 nM |
| Isoleucine | 3.01 μM |
| Leucine | 1.88 μM |
| Glutamine | 531 nM |
| Serine | 938 nM |
| Threonine | 1.01 μM |
| Valine | 1.22 μM |
| Lysine | 2.61 μM |

Figure 8:
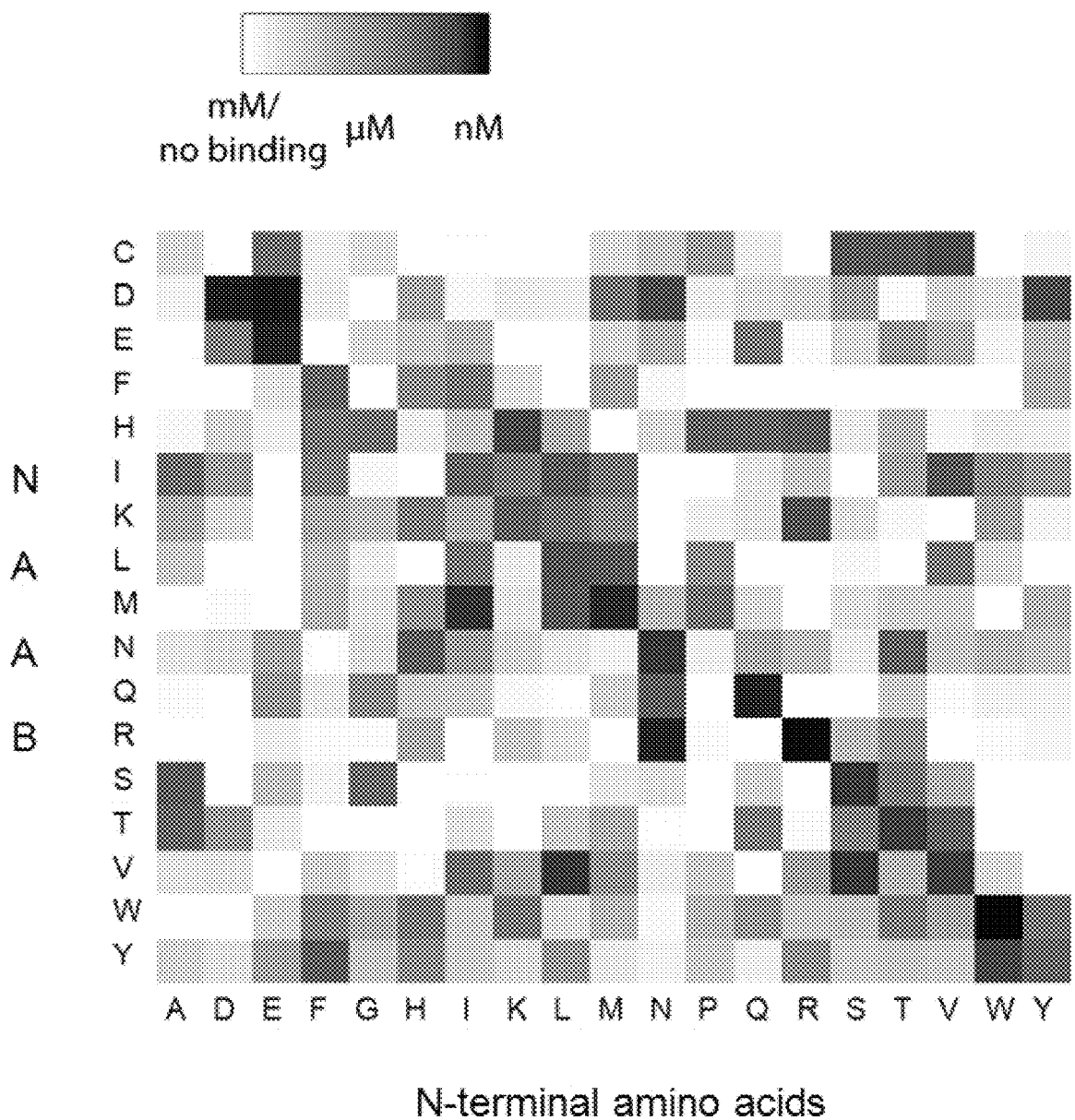
FIG. 8 is a full binding matrix showing the binding affinity of every single NAAB (row) for a single N-terminal amino acid (column) as measured by biolayer interferometry.

FIG. 8 is a full binding matrix that shows how well every engineered NAAB protein binds to every N-terminal amino acid. Each square in the binding matrix represents the binding affinity for a single NAAB with an N-terminal amino acid as measured by biolayer interferometry. Each row in the matrix contains all the binding data for a single NAAB, and each column contains the binding data for a single N-terminal amino acid (shown by single-letter code). Darker squares represent tighter binding. The NAABs exhibit cross-binding for chemically similar N-terminal amino acids. However, the set of predicted binding patterns for each amino acid are distinct. Thus, when taken as a set, the engineered NAAB proteins are capable of identifying amino acids at the N-terminus of peptides.

For reference, the abbreviations of the amino acids are as follows:

| Amino acid | Three letter code | One letter code |
|---|---|---|
| alanine | ala | A |
| arginine | arg | R |
| asparagine | asn | N |
| aspartic acid | asp | D |
| asparagine or aspartic acid | asx | B |
| cysteine | cys | C |
| glutamic acid | glu | E |
| glutamine | gln | Q |
| glutamine or glutamic acid | glx | Z |
| glycine | gly | G |
| histidine | his | H |
| isoleucine | ile | I |
| leucine | leu | L |
| lysine | lys | K |
| methionine | met | M |
| phenylalanine | phe | F |
| proline | pro | P |
| serine | ser | S |
| threonine | thr | T |
| tryptophan | trp | W |
| tyrosine | tyr | Y |
| valine | val | V |

TABLE A

NAAB sequences

| SEQ ID NO: | | |
|---|---|---|
| SEQ ID NO: 1 | wild-type eMAP | MAISIKTPEDIEKMRVAGRLAAEVLEMIEPYVKPGVSTGELD RICNDYIVNEQHAVSACLGYHGYPKSVCISINEVVCHGIPDD AKLLKDGDIVNIDVTVIKDGFHGDTSKMFIVGKPTIMGERLC RITQESLYLALRMVKPGINLREIGAAIQKFVEAEGFSVVREYC GHGIGRGFHEEPQVLHYDSRETNVVLKPGMTFTIEPMVNAG KKEIRTMKDGWTVKTKDRSLSAQYEHTIVVTDNGCEILTLR KDDTIPAIISHDE |
| SEQ ID NO: 2 | eLAP | MAISIKTPEDIEKMRVAGRLAAEVLEMIEPYVKPGVSTGELE RICWDYIVNEQHATDSLTGHNGIDGHGSISINEVVCHGVPDD AKLLKDGDIVNIDVTVRKDGFHGDTSKMFIVGKPTIMGERLC RITQESLYLALRMVKPGINLREIGAAIQKFVEAEGFSVVREYC GHGIGRGHHEEPQVLHYDSRETNVVLKPGMTFTIEPMVNAG KKEIRTMKDGSTVKTKDRSLSAQYEHTIVVTDNGCEILTLRK DDTIPAIISHDE |
| SEQ ID NO: 3 | truncated wild-type MetRS (4-547) | AKKILVTCALPYANGSIHLGHMLEHIQADVWVRYQRMRGH EVNFICADDAHGTPIMLKAQQLGITPEQMIGEMSQEHQTDFA GFNISYDNYHSTHSEENRQLSELIYSRLKENGFIKNRTISQLY DPEKGMFLPDRFVKGTCPKCKSPDQYGDNCEVCGATYSPTE LIEPKSVVSGATPVMRDSEHFFFDLPSFSEMLQAWTRSGALQ EQVANKMQEWFESGLQQWDISRDAPYFGFEIPNAPGKYFYV WLDAPIGYMGSFKNLCDKRGDSVSFDEYWKKDSTAELYHFI GKDIVYFHSLFWPAMLEGSNFRKPSNLFVHGYVTVNGAKMS KSRGTFIKASTWLNHFDADSLRYYYTAKLSSRIDDIDLNLED FVQRVNADIVNKVVNLASRNAGFINKRFDGVLASELADPQL YKTFTDAAEVIGEAWESREFGKAVREIMALADLANRYVDEQ APWVVAKQEGRDADLQAICSMGINLFRVLMTYLKPVLPKLT ERAEAFLNTELTWDGIQQPLLGHKVNPFKALYNRIDMRQVE ALVEASK |
| SEQ ID NO: 4 | Met NAAB* | AKKILVTCASPYANGSIHLGHMLEHIQADVWVRYQRMRGH EVNFICADDAHGTPIMLKAQQLGITPEQMIGEMSQEHQTDFA GFNISYDNYHSTHSEENRQLSELIYSRLKENGFIKNRTISQLY DPEKGMFLPDRFVKGTCPKCKSPDQYGDNCEVCGATYSPTE LIEPKSVVSGATPVMRDSEHFFFDLPSFSEMLQAWTRSGALQ |

TABLE A-continued

NAAB sequences

| SEQ ID NO: | | |
|---|---|---|
| | | EQVANKMQEWFESGLQQWDISRDAPYFGFEIPNAPGKYFYV WLDAPIGLMGSFKNLCDKRGDSVSFDEYWKKDSTAELYHFI GKGIVYFLSLFWPAMLEGSNFRKPSNLFVHGYVTVNGAKMS KSRGTFIKASTWLNHFDADSLRYYYTAKLSSRIDDIDLNLED FVQRVNADIVNKVVNLASRNAGFINKRFDGVLASELADPQL YKTFTDAAEVIGEAWESREFGKAVREIMALADLANRYVDEQ APWVVAKQEGRDADLQAICSMGINLFRVLMTYLKPVLPKLT ERAEAFLNTELTWDGIQQPLLGHKVNPFKALYNRIDMRQVE ALVEASK |
| SEQ ID NO: 5 | wild-type MetRS (full length) | MTQVAKKILVTCALPYANGSIHLGHMLEHIQADVWVRYQR MRGHEVNFICADDAHGTPIMLKAQQLGITPEQMIGEMSQEH QTDFAGFNISYDNYHSTHSEENRQLSELIYSRLKENGFIKNRT ISQLYDPEKGMFLPDRFVKGTCPKCKSPDQYGDNCEVCGAT YSPTELIEPKSVVSGATPVMRDSEHFFFDLPSFSEMLQAWTRS GALQEQVANKMQEWFESGLQQWDISRDAPYFGFEIPNAPGK YFYVWLDAPIGYMGSFKNLCDKRGDSVSFDEYWKKDSTAE LYHFIGKDIVYFHSLFWPAMLEGSNFRKPSNLFVHGYVTVN GAKMSKSRGTFIKASTWLNHFDADSLRYYYTAKLSSRIDDID LNLEDFVQRVNADIVNKVVNLASRNAGFINKRFDGVLASEL ADPQLYKTFTDAAEVIGEAWESREFGKAVREIMALADLANR YVDEQAPWVVAKQEGRDADLQAICSMGINLFRVLMTYLKP VLPKLTERAEAFLNTELTWDGIQQPLLGHKVNPFKALYNRID MRQVEALVEASKEEVKAAAAPVTGPLADDPIQETITFDDFA KVDLRVALIENAEFVEGSDKLLRLTDLGGEKRNVFSGIRSA YPDPQALIGRHTIMVANLAPRKMRFGISEGMVMAAGPGGKD IFLLSPDAGAKPGHQVK |
| SEQ ID NO: 6 | truncated wild-type PheRS (86-350) | VDVSLPGASLFSGGLHPITLMERELVEIFRALGYQAVEGPEV ESEFFNFDALNIPEHHPARDMWDTFWLTGEGFRLEGPLGEEV EGRLLLRTHTSPMQVRYMVAHTPPFRIVVPGRVFRFEQTDAT HEAVFHQLEGLVVGEGIAMAHLKGAIYELAQALFGPDSKVR FQPVYFPFVEPGAQFAVWWPEGGKWLELGGAGMVHPKVFQ AVDAYRERLGLPPAYRGVTGFAFGLGVERLAMLRYGIPDIR YFFGGRLKFLEQFKGVL |
| SEQ ID NO: 7 | PheNAAB (86-350) | VDVSLPGASLFSGGDHPITLMERELVEIFRALGYQAVEGPEV ESEFFNFDALNIPENGPARDMWDTVGKTGEGFRLEGPDGEE VEGRLLLRTHTSPMQVRYMVAHTPPFRIVVPGRVFRAEQTD ATAEAVFHQLEGLVVGEGVNEGDLYGAIYELAQALFGPDSK VRFQPVTFPFVEPGAQFAVWWPEGGKWLELGGAGMVGPNV FQAVDAYRERLGDPPAYRGVTGFAFGLGVERLAMLRYGIPD IRYF |
| SEQ ID NO: 8 | wild-type PheRS (full length) | MLEEALAAIQNARDLEELKALKARYLGKKGLLTQEMKGLS ALPLEERRKRGQELNAIKAALEAALEAREKALEEAALKEAL ERERVDVSLPGASLFSGGLHPITLMERELVEIFRALGYQAVE GPEVESEFFNFDALNIPEHHPARDMWDTFWLTGEGFRLEGPL GEEVEGRLLLRTHTSPMQVRYMVAHTPPFRIVVPGRVFRFEQ TDATHEAVFHQLEGLVVGEGIAMAHLKGAIYELAQALFGPD SKVRFQPVYFPFVEPGAQFAVWWPEGGKWLELGGAGMVHP KVFQAVDAYRERLGLPPAYRGVTGFAFGLGVERLAMLRYGI PDIRYFFGGRLKFLEQFKGVL |
| SEQ ID NO: 9 | truncated wild-type HisRS (3-180) | NIQAIRGMNDYLPGETAIWQRIEGTLKNVLGSYGYSEIRLPIV EQTPLFKRAIGEVTDVVEKEMYTFEDRNGDSLTLRPEGTAGC VRAGIEHGLLYNQEQRLWYIGPMFRHERPQKGRYRQFHQLG CEVFGLQGPDIDAELIMLTARWWRALGISEHVTLELNSIGSL EARANYRDA |
| SEQ ID NO: 10 | HisNAAB (3-180) | KNIQAIRGMNDYLPGETAIWQRIEGTLKNVLGSYGYSEIRLPI VEQTPLFKRAIGEVTDVVEKEMYTFEDRNGDSLTLRPEGTA GCVRAGIEHGLLYNQEQRLWYIGPMFGNAPQFHQLGCEVFG LQGPDIDAELIMLTARWWRALGISEHVTLELNSIGSLEARAN YRDA |
| SEQ ID NO: 11 | AlaNAAB | SKSTAEIRQAFLDFFHSKGHQVVASSSLVPHNDPTLLFTNAG MNQFKDVFLGLDKRNYSRATTSQRCVRAGGKHNDLENVGY TARHHTFFEMLGNFSFGDYFKHDAIQFAWELLTSEKWF ALPKERLWVTVYESDDEAYEIWEKEVGIPRERIIRIGDNKGA PYASDNFWQMGDTGPCGPCTEIFYDHGDHIWGGPPGSPEED GDRYIEIWNIVFMQFNRQADGTMEPLPKPSVDTGMGL ERIAAVLQHVNSNYDIDL |

TABLE A-continued

NAAB sequences

| SEQ ID NO: | | |
|---|---|---|
| SEQ ID NO: 12 | ArgNAAB | EKQTIVVDYSAPNVAKEMHVGHLRSTIIGDAAVRTLEFLGH KVIRANHVGDWGTQFGMLIAWLEKQQQENAGEMELADLE GFYRDAKKHYDEDEEFAERARNYVVKLQSGDEYFREMWR KLVDITMTQNQITYDRLNVTLTRDDVMGESLYNPMLPGIVA DLKAKGLAVESEGATVVFLDEFKNKEGEPMGVIIQKKDGGY LYTTTDIACAKYRYESLHADRVLYYIDSRQHQHLMQAWAIV RKAGYVPESVPLEHHMFGMMLGKDGKPFKTRAGGTVKLAD LLDETLERARRLVAEKNPDMPADELEKLANAVGIGAVKYA DLSKNRTTDYIFDWDNMLAFEGNTAPYMQYAYTRVLSVFR KAEINEEQLAAAPVIIREDREAQLAARLLQFEETLTVVAREG TPHVMCAYLYDLAGLFSGFYEHCPILSAENEEVRNSRLKLAQ LTAKTLKLGLDTLGIETVERM |
| SEQ ID NO: 13 | AsnNAAB | SIEYLREVAHLRPRTNLIGAVARVRHTLAQALHRFFNEQGFF WVSTPLITASDTEGAGEMFRVSTLDDLE NLPRNDQGKVDFDKDFFGKESFLTVSGQLNGETYACALSKI YTFGPTFRAENSNTSRHLAEFWMLEPEVAFANLNDIAGLAE AMLKYVFKAVLEERADDMKFFAERVDKDAVSRLERFIEADF AQVDYTDAVTILENCGRKFENPVYWGVDLSSEHERYLAEEH FKAPVVVKNYPKDIKAFYMRLNEDGKTVAAMDVLAPGIGEI IGGSQREERLDVLDERMLEMGLNKEDYWWYRDLRRYGTVP HSGFGLGFERLIAYVTGVQNVRDVIPFPRTP |
| SEQ ID NO: 14 | AspNAAB | LPLDSNHVNTEEARLKYRYLDLRRPEMAQRLKTRAKITSLV RRFMDDHGFLDIETPMLTKATPEGARDYLVPSRVHKGKFYA LPQSPQLFKQLLMMSGFDRYYQIVKCFRDEDLRADRQPEFT QIDVETSFMTAPQVREVMEALVRHLWLEVKGVDLGDFPVM TFAEAERRYGSDKPDLRNPMELTDVADLLRSVEFAVFAGPA NDPKGRVAALRVPGGASLTRKQIDEYDNFVKIYGAKGLAYI KVNERAKGLEGINSPVAKFLNAEHEAILDRTAAQDGDMIFFG ADNKKIVADAMGALRLKVGKDLGLTDESKWAPLWVIDFPM FEDDGEGGLTAMHHPFTSPKDMTAAELKAAPENAVANAYD MVINGYEVGGGSVRIHNGDMQQTVFGILGINEEEQREKFGFL LDALKYGTPPHAGLAFGLDRLTMLLTGTDNIRDVIAFPK |
| SEQ ID NO: 15 | CysNAAB | MLKIFNTLTRQKEEFKPIHAGEVGMYVCGITVYDLCHIGHGR TFVAFDVVARYLRFLGYKLKYVRNITDI DDKIIKRANENGESFVAMVDRMIAEMHKDFDALNILRPDME PRATHHIAEIIELTEQLIAKGHAYVADNGDVMFDVPTDPTYG VLSRQDLDQLQAGARVDVVDDKRNPMDFVLWKMSKEGEP SWPSPWGAGRPGWHIECSAMNCKQLGNHFDIHGGGSDLMF PHHENEIAQSTCAHDGQYVNYWMHSGMVMVDREKMSKSL GNFFTVRDVLKYYDAETVRYFLMSGHYRSQLNY |
| SEQ ID NO: 16 | GlnNAAB | TNFIRQIIDEDLASGKHTTVHTRFPPEPNGYLHIGHAKSICLNF GIAQDYKGQCNLRFDDTNPVKEDIEYVESIKNDVEWLGFHW SGNVRYSSDYFDQLHAYAIELINKGLAYVDELTPEQIREYRG TLTQPGKNSPYRDRSVEENLALFEKMRTGGFEEGKACLRAKI DMASPFIVMRDPVLYRIKFAEHHQTGNKWCIYPMYDFTHCIS DALEGITHSLCTLEFQDNRRLYDWVLDNITIPVHPRQYEFSR |
| SEQ ID NO: 17 | GluNAAB | IKTRFAPSPTGYLHVGGARTALYSWLFARNHGGEFVLRIEDT DLERSTPEAIEAIMDGMNWLSLEWDEGPYYQTKRFDRYNAV IDQMLEEGTAYKCYCSKERLEALREEQMAKGEKPRYDGRC RHSHEHHADDEPCVVRFANPQEGSVVFDDQIRGPIEFSNQEL DDLIIRRTDGSPTYNFCVVVDDWDMEITHVIRGEDHINNTPR QINILKALNAPVPVYAHVSMINGDDGKKLSKRHGAVSVMQ YRDDGYLPEALLNYLVRLGWSHGDQEIFTREEMIKYFTLNA VSKSASAFNTDKLLWLNHHYI |
| SEQ ID NO: 18 | IleNAAB | FPMRGDLAKREPGMLARWTDDDLYGIIRAAKKGKKTFILHD GPPYANGSIHIGHSVNKILKDIIIKSKGLSGYDSPYVPGWDCH GLPIELKVEQEYGKPGEKFTAAEFRAKCREYAATQVDGQRK DFIRLGVLGDWSHPYLTMDFKTEANIIRALGKIIGNGHLHKG AKPVHWCVDCRSALAEAEVEYYDKTSPSIVAFQAVDQDAL KTKFGVSNVNGPISLVIWTTTPWTLPANRAISIAPDFDYALVQ IDGQAVILAKDLVESMQRIGVSDYTILGTVKGAELELLRFTH PFMDFDVPAILGDHVTLDAGTGAVHTAPGHGPDDYVIGQKY GLETANPVGPDGTYLPGTYPTLDGVNVFKANDIVVALLQEK GALLHVEKMQHSYPCCWRHKTPIIFRATPQWFVSMDQKGLR AQSLKEIKGVQWIPDWGQARIESMVANRPDWCISRQRTWG VPMSLFVHKDTEELHPRTLELMEEVAKRVEVDGIQAWWDL DAKEILGDEADQYVKVPDTLDVWFDSGSTHSSVVDVRPEFA GHAADMYLEGSDQHRGWFMSSLMISTAMKGKAPYRQVLT |

TABLE A-continued

NAAB sequences

| SEQ ID NO: | | |
|---|---|---|
| | | HGFTVDGQGRKMSKSIGNTVSPQDVMNKLGADILRLWVAS TDYTGEMAVSDEILKRAADSYRRIRNTARFLLANLNGFDPA KDMVKPEEMVVLDRWAVGCAKAAQEDILKAYEAYDFHEV VQRLMRFCSVEMGSFYLDIIKDRQYTAKADSVARRSCQTAL YHIAEALVRWMAPILSFTADEVWGYLPGERE |
| SEQ ID NO: 19 | LeuNAAB | IESKVQLHWDEKRTFEVTEDESKEKYYCLSMLPYPSGRLHM GHVRNYTIGDVIARYQRMLGKNVLQPIGWDAFGLPAEGAA VKNNTAPAPWTYDNIAYMKNQLKMLGFGYDWSRELATCTP EYYRWEQKCFTELYKKGLVYKKTSAVNWCPNDQTVLANE QVIDGCCWRCDTKVERKEIPQWFIKITAYADELLNDLDKLD HWPDTVKTMQRNWIGRSEGVEITFNVKDYDNTLTVYTTRPD TFMGCTYLAVAAGHPLAQKAAENNPELAAFIDECRNTKVAE AEMATMEKKGVDTGFKAVHPLTGEEIPVWAANFVLMEYGT GAVMAVPGHDQRDYEFASKYGLNIKPVILAADGSEPDLSQQ ALTEKGVLFNSGEFNGLDHEAAFNAIADKLTEMGVGERKVN YRLRDWGVSRQRYWGAPIPMVTLEDGTVMPTPDDQLPVILP EDVVMDGITSPIKADPEWAKTTVNGMPALRETDTFDTFMES SWYYARYTCPEYKEGMLDSKAANYWLPVDIYIGGIEHAIMH LLYFRFFHKLMRDAGMVNSDEPAKQLLCQGMVLADAFYYV GENGERNWVSPVDAIVERDEKGRIVKAKDAAGHELVYTGM SKMSKSKNNGIDPQVMVERYGADTVRLFMMFASPADMTLE WQESGVEGANRFLKRVWKLVYEHTAKGDVAALNVDALTE DQKALRRDVHKTIAKVTDDIGRRQTFNTAIAAIMELMNKLA KAPTDGEQDRALMQEALLAVVRMLNPFTPHICFTLWQELKG EGDIDNAPWP |
| SEQ ID NO: 20 | LysNAAB | ANDKSRQTFVVRSKILAAIRQFMVARGFMEVETPMMQVIPG GASARPFITHHNALDLDMYLRIAPELYLKRLVVGGFERVFEI NRNFRNEGISVRHNPEFTMMELYMAYADYHDLIELTESLFRT LAQEVLGTTKVTYGEHVFDFGKPFEKLTMREAIKKYRPETD MADLDNFDAAKALAESIGITVEKSWGLGRIVTEIFDEVAEAH LIQPTFITEYPAEVSPLARRNDVNPEITDRFEFFIGGREIGNGFS ELNDAEDQAERFQEQVNAKAAGDDEAMFYDEDYVTALEY GLPPTAGLGIGIDRMIMLFTNSHTIRDVILFPAMRP |
| SEQ ID NO: 21 | ProNAAB | MIRKLASGLYTWLPTGVRVLKKVENIVREEMNNAGAIEVLM PVVQPSELWQESGRWEQYGPELLRIADRGDRPFVLGPTHEE VITDLIRNELSSYKQLPLNFYQIQTKFRDEVRPRFGVMRSREF LMKDAYSFHTSQESLQETYDAMYAAYSKIFSRMGLDFRAVQ ADTGSIGGSASHEFQVLAQSGEDDVVFSDTSDYAANIELAEA IAPKEPRAAATQEMTLVDTPNAKTIAELVEQFNLPIEKTVKTL LVKAVEGSSFPLVALLVRGDHELNEVKAEKLPQVASPLTFAT EEEIRAVVKAGPGSLGPVNMPIPVVIDRTVAAMSDFAAGANI DGKHYFGINWDRDVATPEIADIRNVVAGDPSPDGQGTLLIKR GIEVGHIFQLG |
| SEQ ID NO: 22 | SerNAAB | MLDPNLLRNEPDAVAEKLARRGFKLDVDKLGALEERRKVL QVKTENLQAERNSRSKSIGQAKARGEDIEPLRLEVNKLGEEL DAAKAELDALQAEIRDIALTIPNLPADEVPVGKDENDNVEVS RWGTPREFDFEVRDHVTLGEMYSGLDFAAAVKLTGSRFVV MKGQIARMHRALSQFMLDLHTEQHGYSENYVPYLVNQDTL YGTGQLPKFAGDLFHTRPLEEEADTSNYALIPTAEVPLTNLV RGEIIDEDDLPIKMTAHTPCFRSEAGSYGRDTRGLIRMHQFD KVEMVQIVRPEDSMAALEEMTGHAEKVLQLLGLPYRKIILC TGDMGFGACKTYDLEVWIPAQNTYREISSCSNVWDFQARR MQARCRSKSDKKTRLVHTLNGSGLAVGRTLVAVMENYQQ ADGRIEVPEVLRPYMNGLEYI |
| SEQ ID NO: 23 | ThreNAAB | RDHRKIGKQLDLYHMQEEAPGMVFWHNDGWTIFRELEVFV RSKLKEYQYQEVKGPFMMDRVLWEKTGHWDNYKDAMFTT SSENREYCIKPMNCPGHVQIFNQGLKSYRDLPLRMAEFGSCH RNEPSGSLHGLGRVRGFTQDDAHIFCTEEQIRDEVNGCIRLV YDMYSTFGFEKIVVKLSTRPEKRIGSDEMWDRAEADLAVAL EENNIPFEYQLGEGAFYGPKIEFTLYDCLDRAAQCGTVQLDF SLPSRLSASYVGEDNERKVPVMIHRAILGSMEVFIGILTEEFA GFFPTWLAPVQVVIMNITDSQSEYVNELTQKLSNAGIRVKAD LRNEKIGFKIREHTLRRVPYMLVCGDKEVESGKVAVRTRRG KDLGSMDVNEVIEKLQQEIRSRSLKQLEE |
| SEQ ID NO: 24 | TrpNAAB | MTKPIVFSGAQPSGELTIGNYMGALRQWINMQDDYHCIYCI VDQHAITVRQDAQKLRKATLDTLALYLACGIDPEKSTIFVQS HVPEHAQLGWALNCYTYFGELSRMTQFKDKSARYAENINA GLFDYPVLMAADILLYQTNLVPVGEDQKQHLELSRDIAQRF NALYGDIFKVPEPFIPKSGARVMSLLEPTKKMSKSDDNRNNV |

TABLE A-continued

NAAB sequences

| SEQ ID NO: | | |
|---|---|---|
| | | IGLLEDPKSVVKKIKRAVTDSDEPPVVRYDVQNKAGVSNLL DILSAVTGQSIPELEKQ |
| SEQ ID NO: 25 | TyrNAAB | MASSNLIKQLQERGLVAQVTDEEALVERLAQGPIALYCGFDP TADSLHLGHLVPLLCLKRFQQAGHKPVALVGGATGLIGDPS FKAAERKLNTEETVQEWVDKIRKQVAPFLDFDCGENSAIAA NNYDWFGNMNVLTFLRDIGKHFSVNQMINKEAVKQRLNRE DQGISFTEFSYNLLQGYDFACLNKQYGVVLQIGGSDQWGNI TSGIDLTRRLHQNQVFGLTVPLITKADGTKFGKTEGGAVWL DPKKTSPYKFYQFWINTADADVYRFLKFFTFMSIEEINALEEE DKNSGKAPRAQYVLAEQVTRLVHGEEGLQAAKRITECLFSG SLSALSEADFEQLAQDGVPMVKMEKGADLMQALVDSELQP SRGQARKTIASNAITINGEKQSDPEYFFKEEDRLFGRFTLLRR GKKNYCLICWK |
| SEQ ID NO: 26 | ValNAAB | MEKTYNPQDIEQPLYEHWEKQGYFKPNGDESQESFCIMIPPP NVTGSLHMGHAFQQTIMDTMIRYQRMQGKNTLWQVGTDH AGIATQMVVERKIAAEEGKTRHDYGREAFIDKIWEWKAESG GTITRQMRRLGNSVDWERERFTMDEGLSNAVKEVFVRLYK EDLIYRGKRLVNWDPKLRTAISDLEVENRESKGSMWHIRYP LADGAKTADGKDYLVVATTRPETLLGDTGVAVNPEDPRYK DLIGKYVILPLVNRRIPIVGDEHADMEKGTGCVKITPAHDFN DYEVGKRHALPMINILTFDGDIRESAQVFDTKGNESDVYSSEI PAEFQKLERFAARKAVVAAIDALGLLEEIKPHDLTVPYGDRG GVVIEPMLTDQWYVRADVLAKPAVEAVENGDIQFVPKQYE NMYFSWMRDIQDWCISRQLWWGHRIPAWYDEAGNVYVGR NEEEVRKENNLGADVALRQDEDVLDTWFSSALWTFSTLGW PENTDALRQFHPTSVMVSGFDIIFFWIARMIMMTMHFIKDEN GKPQVPFHTVYMTGLIRDDEGQKMSKSKGNVIDPLDMVDGI SLPELLEKRTGNMMQPQLADKIRKRTEKQFPNGIEPHGTDAL RFTLAALASTGRDINWDMKRLEGYRNFCNKLWNASRFVLM NTEGQDCGFNGGEMTLSLADRWILAEFNQTIKAYREALDSF RFDIAAGILYEFTWNQFCDWYLELTKPVMNGGTEAELRGTR HTLVTVLEGLLRLAHPIIPFITETIWQ |
| SEQ ID NO: 27 | Phospho- tyrosine NAAB** | MDEFEMIKRNTSEIISELREVLKKDEKSALIGFEPSGKIHLGH YLQKKMIDLQNAGFDIIIPLADLHAYLNQKGELDEIRKIGDY NKKVFEAMLKAKYVYGSEFQLDKYTLNVYRLALKTTLKAR RSMELIAREDENPVAEVIYPIMQVNGCHYKGVDVAVGGME QRKIMLARELLPKKVVCIHPVLTGLDGEGKMSSSGNFIAVDD SPEEIRAFKKAYCPAGVVEGNPEIAKYFLEYPLTIKPEKFGGD LTVNSYEESLFKNKELHPMDLKAVAEELIKILEPIRK |
| SEQ ID NO: 28 | Phospho- serine NAAB | MRFDPEKIKKDAKENFDLTWNEGKKMVKTPTLNERYPRTTF RYGKAHPVYDTIQKLREAYLRMGFEEMMNPLIVDEKEVHK QFGSEALAVLDRCFYLAGLPRPNVGISDERIAQINGILGDIGD EGIDKVRKVLHAYKKGKVEGDDLVPEISAALEVSDALVAD MIEKVFPEFKELVAQASTKTLRSHMTSGWFISLGALLERKEP PFHFFSIDRCFRREQQEDASRLMTYYSASCVIMDENVTVDHG KAVAEGLLSQFGFEKFLFRPDEKRSKYYVPDTQTEVFAFHPK LVGSNSKYSDGWIEIATFGIYSPTALAEYDIPCPVMNLGLGVE RLAMILHDAPDIRSLTYPQIPQYSEWEMSDSELAKQVFVDKT PETPEGREIADAVVAQCELHGEEPSPCEFPAWEGEVCGRKVK VSVIEPEENTKLCGPAAFNEVVTYQGDILGIPNTKKWQKAFE NHSAMAGIRFIEAFAAQAAREIEEAAMSGADEHIVRVRIVKV PSEVNIKIGATAQRYITGKNKKIDMRGPIFTSAKAEFE |

*Utilizes base truncation mutant reported in reference (3) with an additional mutation of our own design.
**Truncated version of sulfotyrosine tRNA synthetase mutant from (2). The full length mutant is under patent - no. U.S. Pat. No. 8,114,652 B2.

TABLE B

Edmanase Sequence

| SEQ ID NO: 29 | APAAVDWRARGAVTAVKDSGQCGSGWAFAAIGNVECQWFLA GHPLTNLSEQMLVSCDKTDSGCSSGLMDNAFEWIVQENNGA VYTEDSYPYASATGISPPCTTSGHTVGATITGHVELPQDEA QIAAWLAVNGPVAVCVDASSWMTYTGGVMTSCVSESYDHGV LLVGYNDSHKVPYWIIKNSWTTQWGEEGYIRIAKGSNQCLV KEEASSAVVG |
|---|---|

REFERENCES

1. Ingolia N T, Ghaemmaghami S, Newman J R S, Weissman J S. *Genome-wide analysis in vivo of translation with nucleotide resolution using ribosome profiling.* Science, 2009, 324: 218.
2. Grimsrud P A, Swaney D L, Wenger C D, Beauchene N A, Coon J J. *Phosphoproteomics for the masses.* ACS Chem Biol. 2010, 5: 105-119.
3. Duncan M W, Aebersold R, Caprioli R M. *The pros and cons of peptide-centric proteomics.* Nat Biotechnol. 2010.

4. Gillette M A, Mani D R, Carr S A. *Place of Pattern in Proteomic Biomarker Discovery*. J Proteome Res. 2005, 4: 1143-1154.
5. Anderson N L, Anderson N G. *The human plasma proteome: history, character, and diagnostic prospects*. Mol Cell Proteomics. 2002
6. Edman P. *Method for determination of the amino acid sequence in peptides*. Acta Chem Scand. 1950, 4: 283-293.
7. Mitra R D, Tessler L A. *Single Molecule Protein Screening*. WO 2010/065531 A1.
8. Tessler L A, Donahoe C D, Garcia D J, Jun Y S, Elbert D L, Mitra R D. *Nanogelsurface coatings for improved single-molecule imaging substrates*. J R Soc Interface. 2011
9. Tessler L A, Reifenberger J G, Mitra R D. *Protein Quantification in Complex Mixtures by SolidPhase Single-Molecule Counting*. Anal Chem. 2009, 81: 7141-7148.
10. Emmert-Buck M R, Bonner R F, Smith P D, Chuaqui R F, Zhuang Z, Goldstein S R, Weiss R A, Liotta L A. *Laser capture microdissection*. Science. 1996, 274: 998.
11. Havranek J J, Harbury P B. *Automated design of specificity in molecular recognition*. Nat Struct Biol. 2003, 10: 45-52.
12. Ashworth J, Havranek J J, Duarte C M, Sussman D, R. J. Monnat J, Stoddard B L, Baker D. *Computational redesign of endonuclease DNA binding and cleavage specificity*. Nature. 2006
13. Ashworth J, Taylor G K, Havranek J J, Quadri S A, Stoddard B L, Baker D. *Computational reprogramming of homing endonuclease specificity at multiple adjacent base pairs*. Nucleic Acids Res. 2010, 38: 5601.
14. Havranek J J, Baker D. *Motif-directed flexible backbone design of functional interactions*. Protein Sci. 2009, 18: 1293-1305.
15. Berman H, Henrick K, Nakamura H, Markley J L. *The worldwide Protein Data Bank (wwPDB): ensuring a single, unform archive of PDB data*. Nucleic Acids Res. 2006, 35: D301.
16. Schmitt E, Tanrikulu I C, Yoo T H, Panvert M, Tirrell D A, Mechulam Y. *Switching from an induced-fit to a lock-and-key mechanism in an aminoacyl-tRNA synthetase with modified specificity*. J Mol Biol. 2009, 394: 843-851.
17. Studier F W. *Protein production by auto-induction in high-density shaking cultures*. Protein Expr Purif 2005, 41: 207-234.
18. Wolf Y I, Aravind L, Grishin N V, Koonin E V. *Evolution of aminoacyl-tRNA synthetases-analysis of unique domain architectures and phylogenetic trees reveals a complex history of horizontal gene transfer events*. Genome Res. 1999, 9: 689.
19. Finn R D, Tate J, Mistry J, Coggill P C, Sammut S J, Hotz H R, Ceric G, Forslund K, Eddy S R, Sonnhammer E L, Bateman A. *The Pfam proteinfamilies database*. Nucleic Acids Res. 2008, 36: D281-8.
20. Augustine J, Francklyn C. *Design of an active fragment of a class H aminoacyl-tRNA synthetase and its significancefor synthetase evolution*. Biochemistry. 1997, 36: 3473-3482.
21. Arnez J G, Augustine J G, Moras D, Francklyn C S. *The first step of aminoacylation at the atomic level in histidyl-tRNA synthetase*. Proc Natl Acad Sci USA. 1997, 94: 7144.
22. Holm L, Rosenstrom P. *Dali server: conservation mapping in 3D*. Nucleic Acids Res. 2010, 38: W545
23. Kavran J M, Gundllapalli S, O'donoghue P, Englert M, Soll D, Steitz T A. *Structure of pyrrolysyl-tRNA synthetase, an archaeal enzyme for genetic code innovation*. Proc Natl Acad Sci USA. 2007, 104: 11268.
24. Kuhlman B, Baker D. *Native protein sequences are close to optimal for their structures*. Proc Natl Acad Sci US A. 2000; 97:10383-10388.
25. Barrett G C, Penglis A J. *Edman Stepwise degradation of polypeptides: a new strategy employing mild basic cleavage conditions*. Tetrahedron Lett. 1985, 26: 4375-4378.
26. Celej M S, Montich G G, Fidelia G D. *Protein stability induced by ligand binding correlates with changes in protein flexibility*. Protein Sci. 2003, 12: 1496-1506.
27. Choe Y, Brinen L S, Price M S, Engel J C, Lange M, Grisostomi C, Weston S G, Pallai P V, Cheng H, Hardy L W. *Development of α-keto-based inhibitors of cruzain, a cysteine protease implicated in Chagas disease*. Bioorg Med Chem. 2005, 13: 2141-2156.
28. Carter P, Wells J A. *Engineering enzyme specificity by "substrate-assisted catalysis"*. Science. 1987, 237: 394.
29. McGrath M E. *The lysosomal cysteine proteases*. Annu Rev Biophys Biomol Struct. 1999, 28: 181-204.
30. Jiang L, Althoff E A, Clemente F R, Doyle L, Rothlisberger D, Zanghellini A, Gallaher J L, Betker J L, Tanaka F, Barbas C F 3rd, Hilvert D, Houk H N, Stoddard B L, Baker D. *De novo computational design of retro-aldol enzymes*. Science. 2008, 319: 1387-1391.
31. Rothlisberger D, Khersonsky O, Wollacott A M, Jiang L, DeChancie J, Betker J, Gallaher J L, Althoff E A, Zanghellini A, Dym O, Albeck S, Houk K N, Tawfik D S, Baker D. *Kemp elimination catalysts by computational enzyme design*. Nature. 2008, 453: 190-195.
32. Schmidt M W, Baldridge K K, Boatz J A, Elbert S T, Gordon M S, Jensen J H, Koseki S, Matsunaga N, Nguyen K A, Su S. *General atomic and molecular electronic structure system*. J Comput Chem. 1993, 14: 1347-1363.
33. Dantas G, Corrent C, Reichow S L, Havranek J J, Eletr Z M, Isern N G, Kuhlman B, Varani G, Merritt E A, Baker D. *High-resolution structural and thermodynamic analysis of extreme stabilization of human procarboxypeptidase by computational protein design*. J Mol Biol. 2007, 366: 1209-1221.
34. Dunbrack R L. *Backbone-dependent rotamer library for proteins application to side-chain prediction*. J Mol Biol. 1993, 230: 543-574.
35. Chiravuri M, Agarraberes F, Mathieu S L, Lee H, Huber B T. *Vesicular localization and characterization of a novel post-proline-cleaving aminodipeptidase, quiescent cell proline dipeptidase*. J Immunol. 2000, 165: 5695.
36. Fukunaga R, Yokoyama S. *Structural insights into the first step of RNA-dependent cysteine biosynthesis in archaea*. Nat Struct Mol Biol. 2007, 14: 272-279.
37. Liu C C, Schultz P G. *Recombinant expression of selectively sulfated proteins in Escherichia coli*. Nat Biotechnol. 2006, 24: 1436-1440.
38. Turner J M, Graziano J, Spraggon G, Schultz P G. *Structural characterization of ap-acetylphenylalanyl aminoacyl-tRNA synthetase*. J Am Chem Soc. 2005, 127: 14976-14977.
39. Xie J, Supekova L, Schultz P G. *A genetically encoded metabolically stable analogue of phosphotyrosine in Escherichia coli*. ACS Chem Biol. 2007, 2: 474-478.
40. O'Brien P J, Herschlag D. *Catalytic promiscuity and the evolution of new enzymatic activities*. Chem Biol. 1999, 6: R91-R105.

What is claimed is:

1. A composition comprising:
   (a) a substrate, wherein the substrate comprises a plurality of polypeptide molecules covalently attached to the substrate; and
   (b) a non-naturally occurring N-terminal amino acid binding (NAAB) protein bound to a N-terminal amino acid residue of a polypeptide molecule of the plurality of polypeptide molecules, wherein the NAAB protein (i) selectively binds the N-terminal amino acid residue with at least about a 1.5:1 ratio of specific to non-specific binding, and (ii) is derived from a tRNA synthetase and comprises one or more mutations in an amino acid-binding domain of the tRNA synthetase, wherein both the NAAB protein and the tRNA synthetase have specificity towards a first amino acid, and wherein the tRNA synthetase has specificity towards said first amino acid in a free form, whereas the NAAB protein has specificity towards said first amino acid incorporated into an N-terminus of a polypeptide, forming the N-terminal amino acid residue.

2. The composition of claim 1, wherein the non-naturally occurring NAAB protein is coupled with or bound to a fluorescent label.

3. The composition of claim 2, wherein the fluorescent label is covalently attached to the non-naturally occurring NAAB protein.

4. The composition of claim 1, wherein the N-terminal amino acid residue to which the non-naturally occurring NAAB protein selectively binds is one selected from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine.

5. The composition of claim 1, wherein the non-naturally occurring NAAB protein selectively binds to methionine and comprises an amino acid sequence having at least about 80% sequence identity to the amino acid sequence of SEQ ID NO: 3 and also containing a serine residue at a position corresponding to position 10 of SEQ ID NO: 3; a leucine residue at a position corresponding to position 257 of SEQ ID NO: 3; a glycine residue at a position corresponding to position 293 of SEQ ID NO: 3; and/or a leucine residue at a position corresponding to position 298 of SEQ ID NO: 3.

6. The composition of claim 5, wherein the NAAB protein comprises an amino acid sequence that is at least 95% identical to the amino acid sequence set forth in SEQ ID NO: 4.

7. The composition of claim 1, wherein the non-naturally occurring NAAB protein selectively binds to phenylalanine and comprises an amino acid sequence having at least about 80% sequence identity to the amino acid sequence of SEQ ID NO: 6 and also containing an aspartate residue at a position corresponding to position 15 of SEQ ID NO: 6, an asparagine residue at a position corresponding to position 57 of SEQ ID NO: 6, a glycine residue at a position corresponding to position 58 of SEQ ID NO: 6, a valine residue at a position corresponding to position 67 of SEQ ID NO: 6, a glycine residue at a position corresponding to position 68 of SEQ ID NO: 6, a lysine residue at a position corresponding to position 69 of SEQ ID NO: 6, an aspartate residue at a position corresponding to position 80 of SEQ ID NO: 6, an alanine residue at a position corresponding to position 120 of SEQ ID NO: 6, an alanine residue at a position corresponding to position 127 of SEQ ID NO: 6, a valine residue at a position corresponding to position 143 of SEQ ID NO: 6, an asparagine residue at a position corresponding to position 144 of SEQ ID NO: 6, a glutamate residue at a position corresponding to position 145 of SEQ ID NO: 6, a glycine residue at a position corresponding to position 146 of SEQ ID NO: 6, an aspartate residue at a position corresponding to position 147 of SEQ ID NO: 6, a tyrosine residue at a position corresponding to position 149 of SEQ ID NO: 6, a threonine residue at a position corresponding to position 172 of SEQ ID NO: 6, a glycine residue at a position corresponding to position 202 of SEQ ID NO: 6, an asparagine residue at a position corresponding to position 204 of SEQ ID NO: 6, an aspartate residue at a position corresponding to position 218 of SEQ ID NO: 6, an alanine residue at a position corresponding to position 251 of SEQ ID NO: 6, a threonine residue at a position corresponding to position 253 of SEQ ID NO: 6, and/or a glycine residue at a position corresponding to position 255 of SEQ ID NO: 6.

8. The composition of claim 7, wherein the NAAB protein comprises an amino acid sequence that is at least 95% identical to the amino acid sequence set forth in SEQ ID NO: 7.

9. The composition of claim 1, wherein the non-naturally occurring NAAB protein selectively binds to histidine and comprises an amino acid sequence having at least about 80% sequence identity to the amino acid sequence of SEQ ID NO: 9 and also containing an asparagine residue at a position corresponding to position 121 of SEQ ID NO: 9 and an alanine residue at a position corresponding to position 122 of SEQ ID NO: 9.

10. The composition of claim 9, wherein the NAAB protein comprises an amino acid sequence that is at least 95% identical to the amino acid sequence set forth in SEQ ID NO: 10.

11. The composition of claim 1, comprising the non-naturally occurring NAAB protein that selectively binds to a PITC-derivatized N-terminal amino acid residue of a polypeptide covalently attached to the substrate with at least about a 1.5:1 ratio of specific to non-specific binding.

* * * * *